United States Patent
Xu et al.

(10) Patent No.: US 12,507,132 B2
(45) Date of Patent: Dec. 23, 2025

(54) METHOD AND APPARATUS FOR MOBILITY OF WIRELESS BASE STATION IN WIRELESS COMMUNICATION SYSTEM

(71) Applicant: LG ELECTRONICS INC., Seoul (KR)

(72) Inventors: Jian Xu, Seoul (KR); Daewook Byun, Seoul (KR); Seokjung Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 605 days.

(21) Appl. No.: 17/911,375

(22) PCT Filed: Apr. 5, 2021

(86) PCT No.: PCT/KR2021/004207
§ 371 (c)(1),
(2) Date: Sep. 13, 2022

(87) PCT Pub. No.: WO2021/201661
PCT Pub. Date: Oct. 7, 2021

(65) Prior Publication Data
US 2023/0095284 A1    Mar. 30, 2023

(30) Foreign Application Priority Data

Apr. 3, 2020   (KR) .................. 10-2020-0041035

(51) Int. Cl.
*H04W 36/00* (2009.01)
*H04W 48/20* (2009.01)
*H04W 88/08* (2009.01)

(52) U.S. Cl.
CPC . *H04W 36/0058* (2018.08); *H04W 36/00695* (2023.05); *H04W 36/00698* (2023.05); *H04W 48/20* (2013.01); *H04W 88/08* (2013.01)

(58) Field of Classification Search
CPC ......... H04W 36/0055; H04W 36/0058; H04W 36/0069; H04W 36/00692;
(Continued)

(56) References Cited

U.S. PATENT DOCUMENTS

2019/0166646 A1* 5/2019 Shih ..................... H04W 72/04
2020/0107342 A1 4/2020 Kuang et al.
(Continued)

FOREIGN PATENT DOCUMENTS

EP    3651526    8/2019
KR    102078956    2/2020
(Continued)

OTHER PUBLICATIONS

3rd Generation Partnership Project (3GPP), "Technical Specification Group Radio Access Network; Evolved Universal Terrestrial Radio Access (E-UTRA) and NR; Multi-connetivity; Stage 2 (Release 16)," 3GPP TS 37.340 V16.0.0, Jan. 2020, 74 pages.
(Continued)

*Primary Examiner* — Matthew W Genack
(74) *Attorney, Agent, or Firm* — LEE, HONG, DEGERMAN, KANG & WAIMEY

(57) ABSTRACT

The present disclosure relates to a mobility of a wireless base station in wireless communications. According to various embodiments, a method performed by a master node (MN) serving a wireless device with a source secondary node (SN) in a dual connectivity (DC) in a wireless communication system comprises: receiving, from the source SN, a message for initiating a SN change procedure, wherein the message comprises an integrated access and backhaul (IAB) node indication informing that the SN change procedure is related to a mobility of an TAB node; selecting a target SN supporting an TAB function based on the TAB node indication; transmitting, to the target SN, an SN
(Continued)

addition request message comprising the TAB node indication; and receiving, from the target SN, an SN addition request acknowledge message.

15 Claims, 13 Drawing Sheets

(58) Field of Classification Search
CPC ..... H04W 36/00695; H04W 36/00698; H04W 36/0085; H04W 36/0088; H04W 36/0094; H04W 48/20
See application file for complete search history.

(56) References Cited

U.S. PATENT DOCUMENTS

| | | | |
|---|---|---|---|
| 2021/0227435 A1* | 7/2021 | Hsieh | H04W 36/087 |
| 2023/0095601 A1* | 3/2023 | Wu | H04W 36/34 370/331 |
| 2023/0139323 A1* | 5/2023 | Ishii | H04W 48/20 455/422.1 |

FOREIGN PATENT DOCUMENTS

| | | |
|---|---|---|
| KR | 20200033166 | 3/2020 |
| WO | 2020033965 | 2/2020 |
| WO | 2020067959 | 4/2020 |

OTHER PUBLICATIONS

Qualcomm (Rapporteur), "CR to 38.300 on Integrated Access and Backhaul for NR," 3GPP TSG-RAN WG2 #109-e, E-meeting, R2-2002407, Mar. 2020, 17 pages.

Huawei, "BL CR to 38.401 Support for IAB," 3GPP TSG-RAN WG3 #107-e, E-meeting, R3-201461, Mar. 2020, 19 pages.

Qualcomm, "New WID on Enhancement to Integrated Access and Backhaul," 3GPP TSG-RAN Meeting #86, RP-193251, Dec. 2019, 5 pages.

Qualcomm, "New WID on Enhancements to Integrated Access and Backhaul," 3GPP TSG-RAN Meeting #88e, Electronic Meeting, RP-201293, Jul. 3, 2020, 5 pages.

PCT International Application No. PCT/KR2021/004207, International Search Report dated Jul. 13, 2021, 2 pages.

* cited by examiner

METHOD AND APPARATUS FOR MOBILITY OF WIRELESS BASE STATION IN WIRELESS COMMUNICATION SYSTEM

CROSS-REFERENCE TO RELATED APPLICATIONS

This application is the National Stage filing under 35 U.S.C. 371 of International Application No. PCT/KR2021/004207, filed on Apr. 5, 2021, which claims the benefit of earlier filing date and right of priority to Korean Application No. 10-2020-0041035, filed on Apr. 3, 2020, the contents of which are all incorporated by reference herein in their entirety.

TECHNICAL FIELD

The present disclosure relates to a mobility of a wireless base station in wireless communications.

BACKGROUND

3rd generation partnership project (3GPP) long-term evolution (LTE) is a technology for enabling high-speed packet communications. Many schemes have been proposed for the LTE objective including those that aim to reduce user and provider costs, improve service quality, and expand and improve coverage and system capacity. The 3GPP LTE requires reduced cost per bit, increased service availability, flexible use of a frequency band, a simple structure, an open interface, and adequate power consumption of a terminal as an upper-level requirement.

Work has started in international telecommunication union (ITU) and 3GPP to develop requirements and specifications for new radio (NR) systems. 3GPP has to identify and develop the technology components needed for successfully standardizing the new RAT timely satisfying both the urgent market needs, and the more long-term requirements set forth by the ITU radio communication sector (ITU-R) international mobile telecommunications (IMT)-2020 process. Further, the NR should be able to use any spectrum band ranging at least up to 100 GHz that may be made available for wireless communications even in a more distant future.

The NR targets a single technical framework addressing all usage scenarios, requirements and deployment scenarios including enhanced mobile broadband (eMBB), massive machine-type-communications (mMTC), ultra-reliable and low latency communications (URLLC), etc. The NR shall be inherently forward compatible.

In a wireless communication system, integrated access and backhaul (IAB) is introduced. An IAB node may communicate with child node(s) and/or parent node(s) via a wireless backhaul link. For example, an IAB node may be served by two parent nodes in DC—one parent node may act as a master node (MN), and the other parent node may act as a secondary node (SN). Further, the IAB node may perform a mobility from a source IAB node to a target IAB node. The mobility may be also performed while the IAB node is served by the MN and the SN in DC.

SUMMARY

1. Technical Problem

An aspect of the present disclosure is to provide method and apparatus for a mobility of a wireless base station in a wireless communication system.

Another aspect of the present disclosure is to provide method and apparatus for a mobility of a wireless device served in a dual connectivity (DC) in a wireless communication system.

Another aspect of the present disclosure is to provide method and apparatus for selecting a target node for a mobility of the wireless base station in a wireless communication system.

2. Technical Solution

According to various embodiments, a method performed by a master node (MN) serving a wireless device with a source secondary node (SN) in a dual connectivity (DC) in a wireless communication system comprises: receiving, from the source SN, a message for initiating a SN change procedure, wherein the message comprises an integrated access and backhaul (IAB) node indication informing that the SN change procedure is related to a mobility of an IAB node; selecting a target SN supporting an IAB function based on the IAB node indication; transmitting, to the target SN, an SN addition request message comprising the IAB node indication; and receiving, from the target SN, an SN addition request acknowledge message.

According to various embodiments, a master node (MN) serving a wireless device with a source secondary node (SN) in a dual connectivity (DC) in a wireless communication system comprises: a transceiver; a memory; and at least one processor operatively coupled to the transceiver and the memory, and configured to: control the transceiver to receive, from the source SN, a message for initiating a SN change procedure, wherein the message comprises an integrated access and backhaul (IAB) node indication informing that the SN change procedure is related to a mobility of an IAB node; select a target SN supporting an IAB function based on the IAB node indication; control the transceiver to transmit, to the target SN, an SN addition request message comprising the IAB node indication; and control the transceiver to receive, from the target SN, an SN addition request acknowledge message.

According to various embodiments, a processor for a master node (MN) serving a wireless device with a source secondary node (SN) in a dual connectivity (DC) in a wireless communication system is configured to control the wireless device to perform operations comprising: receiving, from the source SN, a message for initiating a SN change procedure, wherein the message comprises an integrated access and backhaul (IAB) node indication informing that the SN change procedure is related to a mobility of an IAB node; selecting a target SN supporting an IAB function based on the IAB node indication; transmitting, to the target SN, an SN addition request message comprising the IAB node indication; and receiving, from the target SN, an SN addition request acknowledge message.

According to various embodiments, a computer-readable medium having recorded thereon a program for performing each step of a method on a computer is provided. The method comprises: receiving, from the source SN, a message for initiating a SN change procedure, wherein the message comprises an integrated access and backhaul (IAB) node indication informing that the SN change procedure is related to a mobility of an IAB node; selecting a target SN supporting an IAB function based on the IAB node indication; transmitting, to the target SN, an SN addition request message comprising the IAB node indication; and receiving, from the target SN, an SN addition request acknowledge message.

According to various embodiments, a method performed by a wireless device in a wireless communication system comprises: performing a communication via an integrated access and backhaul (IAB) node served by an master node (MN) and a source secondary node (SN) in dual connectivity (DC); and performing a communication via the IAB node served by the MN and a target SN in DC after the IAB node performed a SN change from the source SN to the target SN, wherein the target SN is selected by the MN such that the target SN supports an IAB function based on an IAB node indication, wherein the IAB node indication informs that the SN change is related to a mobility of an IAB node, wherein the IAB node indication is received by the MN from the source SN via a message for initiating the SN change, and wherein the IAB node indication is transmitted from the MN to the target SN via a SN addition request message for the SN change.

According to various embodiments, a wireless device in a wireless communication system comprises: a transceiver; a memory; and at least one processor operatively coupled to the transceiver and the memory, and configured to control the transceiver to: perform a communication via an integrated access and backhaul (IAB) node served by an master node (MN) and a source secondary node (SN) in dual connectivity (DC); and perform a communication via the IAB node served by the MN and a target SN in DC after the IAB node performed a SN change from the source SN to the target SN, wherein the target SN is selected by the MN such that the target SN supports an IAB function based on an IAB node indication, wherein the IAB node indication informs that the SN change is related to a mobility of an IAB node, wherein the IAB node indication is received by the MN from the source SN via a message for initiating the SN change, and wherein the IAB node indication is transmitted from the MN to the target SN via a SN addition request message for the SN change.

3. Advantageous Effect

The present disclosure may have various advantageous effects.

For example, by providing an IAB node indication, target SN supporting IAB function can be properly selected based on the IAB node indication in SN change procedure for an IAB node.

For example, the enhanced procedure can allow mobile IAB node to be supported in dual connectivity scenario. The handing of migrating/mobile IAB node can be prioritized compared a normal UE from the target donor IAB node point of view, that is, the radio resource handling will be different/prioritized for an IAB node compared with a normal UE.

Advantageous effects which can be obtained through specific embodiments of the present disclosure are not limited to the advantageous effects listed above. For example, there may be a variety of technical effects that a person having ordinary skill in the related art can understand and/or derive from the present disclosure. Accordingly, the specific effects of the present disclosure are not limited to those explicitly described herein, but may include various effects that may be understood or derived from the technical features of the present disclosure.

DETAILED DESCRIPTION

Figure 1:
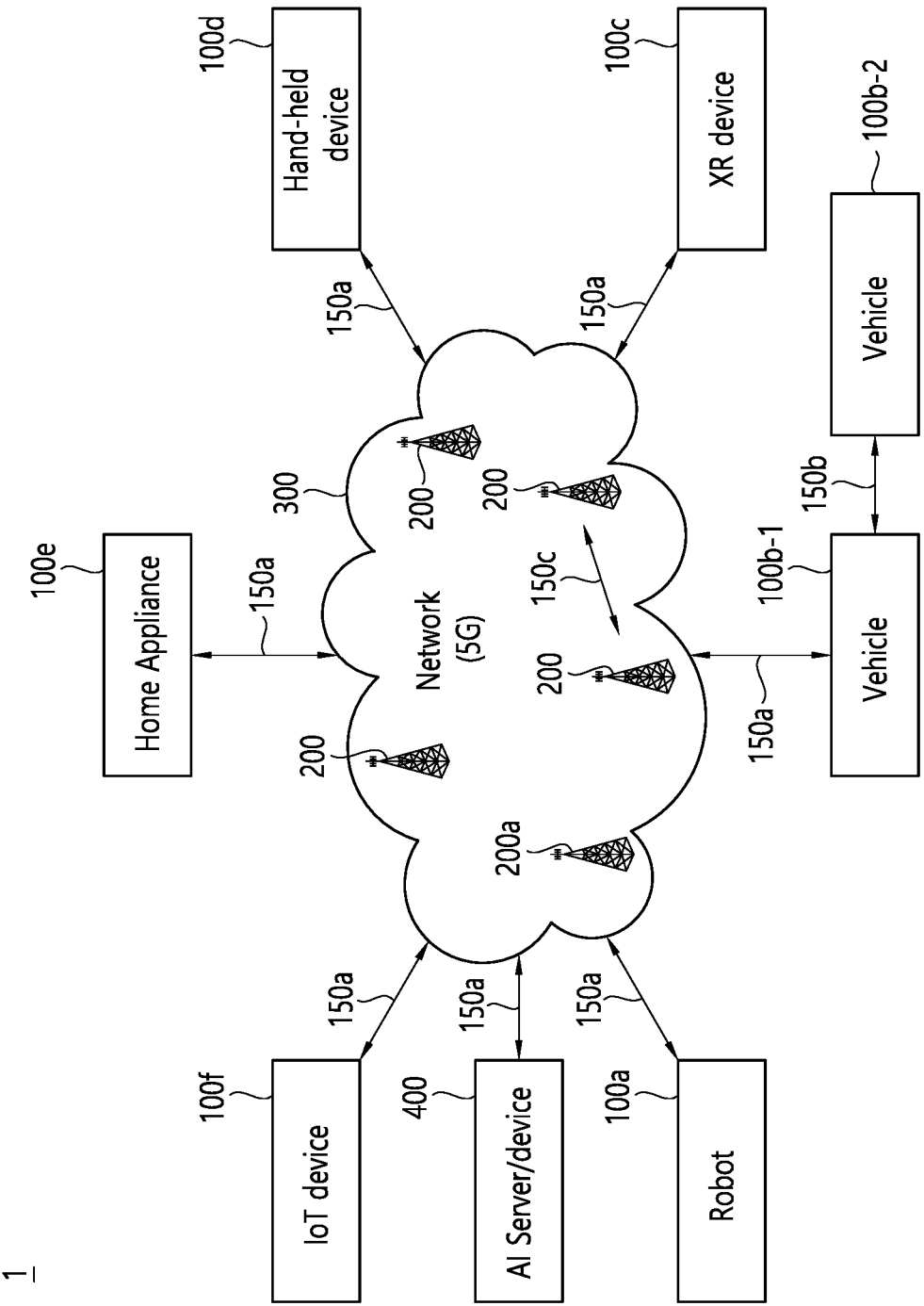
FIG. 1 shows an example of a communication system to which implementations of the present disclosure is applied.

The following techniques, apparatuses, and systems may be applied to a variety of wireless multiple access systems. Examples of the multiple access systems include a code division multiple access (CDMA) system, a frequency division multiple access (FDMA) system, a time division multiple access (TDMA) system, an orthogonal frequency division multiple access (OFDMA) system, a single carrier frequency division multiple access (SC-FDMA) system, and a multicarrier frequency division multiple access (MC-FDMA) system. CDMA may be embodied through radio technology such as universal terrestrial radio access (UTRA) or CDMA2000. TDMA may be embodied through radio technology such as global system for mobile communications (GSM), general packet radio service (GPRS), or enhanced data rates for GSM evolution (EDGE). OFDMA may be embodied through radio technology such as institute of electrical and electronics engineers (IEEE) 802.11 (Wi-Fi), IEEE 802.16 (WiMAX), IEEE 802.20, or evolved UTRA (E-UTRA). UTRA is a part of a universal mobile telecommunications system (UMTS). 3rd generation partnership project (3GPP) long term evolution (LTE) is a part of evolved UMTS (E-UMTS) using E-UTRA. 3GPP LTE employs OFDMA in DL and SC-FDMA in UL. Evolution of 3GPP LTE includes LTE-A (advanced), LTE-A Pro, and/or 5G NR (new radio).

For convenience of description, implementations of the present disclosure are mainly described in regards to a 3GPP based wireless communication system. However, the technical features of the present disclosure are not limited thereto. For example, although the following detailed description is given based on a mobile communication system corresponding to a 3GPP based wireless communication system, aspects of the present disclosure that are not limited to 3GPP based wireless communication system are applicable to other mobile communication systems.

For terms and technologies which are not specifically described among the terms of and technologies employed in the present disclosure, the wireless communication standard documents published before the present disclosure may be referenced.

In the present disclosure, "A or B" may mean "only A", "only B", or "both A and B". In other words, "A or B" in the present disclosure may be interpreted as "A and/or B". For example, "A, B or C" in the present disclosure may mean "only A", "only B", "only C", or "any combination of A, B and C".

In the present disclosure, slash (/) or comma (,) may mean "and/or". For example, "A/B" may mean "A and/or B". Accordingly, "A/B" may mean "only A", "only B", or "both A and B". For example, "A, B, C" may mean "A, B or C".

In the present disclosure, "at least one of A and B" may mean "only A", "only B" or "both A and B". In addition, the expression "at least one of A or B" or "at least one of A and/or B" in the present disclosure may be interpreted as same as "at least one of A and B".

In addition, in the present disclosure, "at least one of A, B and C" may mean "only A", "only B", "only C", or "any combination of A, B and C". In addition, "at least one of A, B or C" or "at least one of A, B and/or C" may mean "at least one of A, B and C".

Also, parentheses used in the present disclosure may mean "for example". In detail, when it is shown as "control information (PDCCH)", "PDCCH" may be proposed as an example of "control information". In other words, "control information" in the present disclosure is not limited to "PDCCH", and "PDCCH" may be proposed as an example of "control information". In addition, even when shown as "control information (i.e., PDCCH)", "PDCCH" may be proposed as an example of "control information".

Technical features that are separately described in one drawing in the present disclosure may be implemented separately or simultaneously.

The terms used throughout the disclosure can be defined as the followings:

'Mobility' refers to a procedure for i) changing a PCell of a UE (i.e., handover or PCell change), ii) changing a PSCell of a UE (i.e., SN change or PSCell change), and/or iii) adding a PSCell for a UE (i.e., SN addition or PSCell addition). Therefore, the mobility may comprise at least one of a handover, an SN change or an SN addition. In other words, the mobility may comprise at least one of PCell change, PSCell change or PSCell addition. Throughout the disclosure, performing a mobility to a target cell may refer to applying a mobility command of the target cell or applying a target cell configuration for the target cell in the mobility command of the target cell. The target cell configuration for the target cell may comprise RRC reconfiguration parameters associated with the mobility to the target cell. Further, RRC reconfiguration and RRC connection reconfiguration may be used interchangeably.

In the disclosure, the target cell configuration may also be referred to as candidate cell configuration. The candidate cell configuration may comprise reconfigurationWithSync, which comprise parameters for the synchronous reconfiguration to the target SpCell. For example, the reconfigurationWithSync may comprise at least one of a new UE-identity (i.e., a kind of RNTI value), timer T304, spCellConfigCommon, rach-ConfigDedicated or smtc. The spCellConfigCommon may comprise ServingCellConfigCommon which is used to configure cell specific parameters of a UE's serving cell. The rach-ConfigDedicated may indicate a random access configuration to be used for a reconfiguration with sync (e.g., mobility). The smtc may indicate a synchronization signal/physical broadcast channel (SS/PBCH) block periodicity/offset/duration configuration of target cell for PSCell change, PCell change and/or PSCell addition. The SS/PBCH block may be simply referred to as synchronization signal block (SSB).

'SN mobility' refers to a procedure for i) changing a PSCell of a UE (i.e., SN change or PSCell change), and/or ii) adding a PSCell for a UE (i.e., SN addition or PSCell addition). Therefore, the SN mobility may comprise at least one of an SN change or an SN addition. In other words, the SN mobility may comprise at least one of PSCell change or PSCell addition. Throughout the disclosure, performing an SN mobility to a target cell may refer to applying an SN mobility command of the target cell or applying a target cell configuration for the target cell in the SN mobility command of the target cell. The target cell configuration for the target cell may comprise RRC reconfiguration parameters associated with the SN mobility to the target cell. The SN mobility may be a kind of a mobility. The SN mobility command may comprise a SN change command for performing SN change, or SN addition command for performing SN addition.

"Integrated access and backhaul (TAB)" refers to a scheme in which a part of a wireless spectrum is used for backhaul connection of base stations instead of fiber (i.e., wireless backhaul). The TAB node may be a kind of a wireless device.

"TAB node" refers to a RAN node that supports wireless access to user equipments (UE)s and wirelessly backhauls the access traffic. The TAB node may be a kind of a wireless base station. The TAB node and the UE may be a kind of a wireless device.

Throughout the disclosure, the terms 'radio access network (RAN) node', 'base station', 'eNB', 'gNB' and 'cell' may be used interchangeably. Further, a UE may be a kind of a wireless device, and throughout the disclosure, the terms 'UE' and 'wireless device' may be used interchangeably.

Throughout the disclosure, the terms 'cell quality', 'signal strength', 'signal quality', 'channel state', 'channel quality', ' channel state/reference signal received power (RSRP)' and ' reference signal received quality (RSRQ)' may be used interchangeably.

Although not limited thereto, various descriptions, functions, procedures, suggestions, methods and/or operational flowcharts of the present disclosure disclosed herein can be applied to various fields requiring wireless communication and/or connection (e.g., 5G) between devices.

Hereinafter, the present disclosure will be described in more detail with reference to drawings. The same reference numerals in the following drawings and/or descriptions may refer to the same and/or corresponding hardware blocks, software blocks, and/or functional blocks unless otherwise indicated.

FIG. 1 shows an example of a communication system to which implementations of the present disclosure is applied.

The 5G usage scenarios shown in FIG. 1 are only exemplary, and the technical features of the present disclosure can be applied to other 5G usage scenarios which are not shown in FIG. 1.

Three main requirement categories for 5G include (1) a category of enhanced mobile broadband (eMBB), (2) a category of massive machine type communication (mMTC), and (3) a category of ultra-reliable and low latency communications (URLLC).

Partial use cases may require a plurality of categories for optimization and other use cases may focus only upon one key performance indicator (KPI). 5G supports such various use cases using a flexible and reliable method.

eMBB far surpasses basic mobile Internet access and covers abundant bidirectional work and media and entertainment applications in cloud and augmented reality. Data is one of 5G core motive forces and, in a 5G era, a dedicated voice service may not be provided for the first time. In 5G, it is expected that voice will be simply processed as an application program using data connection provided by a communication system. Main causes for increased traffic volume are due to an increase in the size of content and an increase in the number of applications requiring high data transmission rate. A streaming service (of audio and video), conversational video, and mobile Internet access will be more widely used as more devices are connected to the Internet. These many application programs require connectivity of an always turned-on state in order to push real-time information and alarm for users. Cloud storage and applications are rapidly increasing in a mobile communication platform and may be applied to both work and entertainment. The cloud storage is a special use case which accelerates growth of uplink data transmission rate. 5G is also used for remote work of cloud. When a tactile interface is used, 5G demands much lower end-to-end latency to maintain user good experience. Entertainment, for example, cloud gaming and video streaming, is another core element which increases demand for mobile broadband capability. Entertainment is essential for a smartphone and a tablet in any place including high mobility environments such as a train, a vehicle, and an airplane. Other use cases are augmented reality for entertainment and information search. In this case, the augmented reality requires very low latency and instantaneous data volume.

In addition, one of the most expected 5G use cases relates a function capable of smoothly connecting embedded sensors in all fields, i.e., mMTC. It is expected that the number of potential Internet-of-things (IoT) devices will reach 204 hundred million up to the year of 2020. An industrial IoT is one of categories of performing a main role enabling a smart city, asset tracking, smart utility, agriculture, and security infrastructure through 5G.

URLLC includes a new service that will change industry through remote control of main infrastructure and an ultra-reliable/available low-latency link such as a self-driving vehicle. A level of reliability and latency is essential to control a smart grid, automatize industry, achieve robotics, and control and adjust a drone.

5G is a means of providing streaming evaluated as a few hundred megabits per second to gigabits per second and may complement fiber-to-the-home (FTTH) and cable-based broadband (or DOCSIS). Such fast speed is needed to deliver TV in resolution of 4K or more (6K, 8K, and more), as well as virtual reality and augmented reality. Virtual reality (VR) and augmented reality (AR) applications include almost immersive sports games. A specific application program may require a special network configuration. For example, for VR games, gaming companies need to incorporate a core server into an edge network server of a network operator in order to minimize latency.

Automotive is expected to be a new important motivated force in 5G together with many use cases for mobile communication for vehicles. For example, entertainment for passengers requires high simultaneous capacity and mobile broadband with high mobility. This is because future users continue to expect connection of high quality regardless of their locations and speeds. Another use case of an automotive field is an AR dashboard. The AR dashboard causes a driver to identify an object in the dark in addition to an object seen from a front window and displays a distance from the object and a movement of the object by overlapping information talking to the driver. In the future, a wireless module enables communication between vehicles, information exchange between a vehicle and supporting infrastructure, and information exchange between a vehicle and other connected devices (e.g., devices accompanied by a pedestrian). A safety system guides alternative courses of a behavior so that a driver may drive more safely drive, thereby lowering the danger of an accident. The next stage will be a remotely controlled or self-driven vehicle. This requires very high reliability and very fast communication between different self-driven vehicles and between a vehicle and infrastructure. In the future, a self-driven vehicle will perform all driving activities and a driver will focus only upon abnormal traffic that the vehicle cannot identify. Technical requirements of a self-driven vehicle demand ultra-low latency and ultra-high reliability so that traffic safety is increased to a level that cannot be achieved by human being.

A smart city and a smart home/building mentioned as a smart society will be embedded in a high-density wireless sensor network. A distributed network of an intelligent sensor will identify conditions for costs and energy-efficient maintenance of a city or a home. Similar configurations may be performed for respective households. All of temperature sensors, window and heating controllers, burglar alarms, and home appliances are wirelessly connected. Many of these sensors are typically low in data transmission rate, power, and cost. However, real-time HD video may be demanded by a specific type of device to perform monitoring.

Consumption and distribution of energy including heat or gas is distributed at a higher level so that automated control of the distribution sensor network is demanded. The smart grid collects information and connects the sensors to each other using digital information and communication technology so as to act according to the collected information. Since this information may include behaviors of a supply company and a consumer, the smart grid may improve distribution of fuels such as electricity by a method having efficiency, reliability, economic feasibility, production sustainability, and automation. The smart grid may also be regarded as another sensor network having low latency.

Mission critical application (e.g., e-health) is one of 5G use scenarios. A health part contains many application programs capable of enjoying benefit of mobile communication. A communication system may support remote treatment that provides clinical treatment in a faraway place. Remote treatment may aid in reducing a barrier against distance and improve access to medical services that cannot be continuously available in a faraway rural area. Remote treatment is also used to perform important treatment and save lives in an emergency situation. The wireless sensor network based on mobile communication may provide remote monitoring and sensors for parameters such as heart rate and blood pressure.

Wireless and mobile communication gradually becomes important in the field of an industrial application. Wiring is high in installation and maintenance cost. Therefore, a possibility of replacing a cable with reconstructible wireless links is an attractive opportunity in many industrial fields. However, in order to achieve this replacement, it is necessary for wireless connection to be established with latency, reliability, and capacity similar to those of the cable and management of wireless connection needs to be simplified. Low latency and a very low error probability are new requirements when connection to 5G is needed.

Logistics and freight tracking are important use cases for mobile communication that enables inventory and package tracking anywhere using a location-based information system. The use cases of logistics and freight typically demand low data rate but require location information with a wide range and reliability.

Referring to FIG. 1, the communication system 1 includes wireless devices 100a to 100f, base stations (BSs) 200, and a network 300. Although FIG. 1 illustrates a 5G network as an example of the network of the communication system 1, the implementations of the present disclosure are not limited to the 5G system, and can be applied to the future communication system beyond the 5G system.

The BSs 200 and the network 300 may be implemented as wireless devices and a specific wireless device may operate as a BS/network node with respect to other wireless devices.

The wireless devices 100a to 100f represent devices performing communication using radio access technology (RAT) (e.g., 5G new RAT (NR)) or LTE) and may be referred to as communication/radio/5G devices. The wireless devices 100a to 100f may include, without being limited to, a robot 100a, vehicles 100b-1 and 100b-2, an extended reality (XR) device 100c, a hand-held device 100d, a home appliance 100e, an IoT device 100f, and an artificial intelligence (AI) device/server 400. For example, the vehicles may include a vehicle having a wireless communication function, an autonomous driving vehicle, and a vehicle capable of performing communication between vehicles. The vehicles may include an unmanned aerial vehicle (UAV) (e.g., a drone). The XR device may include an AR/VR/Mixed Reality (MR) device and may be implemented in the form of a head-mounted device (HMD), a head-up display (HUD) mounted in a vehicle, a television, a smartphone, a computer, a wearable device, a home appliance device, a digital signage, a vehicle, a robot, etc. The hand-held device may include a smartphone, a smartpad, a wearable device (e.g., a smartwatch or a smartglasses), and a computer (e.g., a notebook). The home appliance may include a TV, a refrigerator, and a washing machine. The IoT device may include a sensor and a smartmeter.

In the present disclosure, the wireless devices 100a to 100f may be called user equipments (UEs). A UE may include, for example, a cellular phone, a smartphone, a laptop computer, a digital broadcast terminal, a personal digital assistant (PDA), a portable multimedia player (PMP), a navigation system, a slate personal computer (PC), a tablet PC, an ultrabook, a vehicle, a vehicle having an autonomous traveling function, a connected car, an UAV, an AI module, a robot, an AR device, a VR device, an MR device, a hologram device, a public safety device, an MTC device, an IoT device, a medical device, a FinTech device (or a financial device), a security device, a weather/environment device, a device related to a 5G service, or a device related to a fourth industrial revolution field.

The UAV may be, for example, an aircraft aviated by a wireless control signal without a human being onboard.

The VR device may include, for example, a device for implementing an object or a background of the virtual world. The AR device may include, for example, a device implemented by connecting an object or a background of the virtual world to an object or a background of the real world.

The MR device may include, for example, a device implemented by merging an object or a background of the virtual world into an object or a background of the real world. The hologram device may include, for example, a device for implementing a stereoscopic image of 360 degrees by recording and reproducing stereoscopic information, using an interference phenomenon of light generated when two laser lights called holography meet.

The public safety device may include, for example, an image relay device or an image device that is wearable on the body of a user.

The MTC device and the IoT device may be, for example, devices that do not require direct human intervention or manipulation. For example, the MTC device and the IoT device may include smartmeters, vending machines, thermometers, smartbulbs, door locks, or various sensors.

The medical device may be, for example, a device used for the purpose of diagnosing, treating, relieving, curing, or preventing disease. For example, the medical device may be a device used for the purpose of diagnosing, treating, relieving, or correcting injury or impairment. For example, the medical device may be a device used for the purpose of inspecting, replacing, or modifying a structure or a function. For example, the medical device may be a device used for the purpose of adjusting pregnancy. For example, the medical device may include a device for treatment, a device for operation, a device for (in vitro) diagnosis, a hearing aid, or a device for procedure.

The security device may be, for example, a device installed to prevent a danger that may arise and to maintain safety. For example, the security device may be a camera, a closed-circuit TV (CCTV), a recorder, or a black box.

The FinTech device may be, for example, a device capable of providing a financial service such as mobile payment. For example, the FinTech device may include a payment device or a point of sales (POS) system.

The weather/environment device may include, for example, a device for monitoring or predicting a weather/environment.

The wireless devices 100a to 100f may be connected to the network 300 via the BSs 200. An AI technology may be applied to the wireless devices 100a to 100f and the wireless devices 100a to 100f may be connected to the AI server 400 via the network 300. The network 300 may be configured using a 3G network, a 4G (e.g., LTE) network, a 5G (e.g., NR) network, and a beyond-5G network. Although the wireless devices 100a to 100f may communicate with each other through the BSs 200/network 300, the wireless devices 100a to 100f may perform direct communication (e.g., sidelink communication) with each other without passing through the BSs 200/network 300. For example, the vehicles 100b-1 and 100b-2 may perform direct communication (e.g., vehicle-to-vehicle (V2V)/vehicle-to-everything (V2X) communication). The IoT device (e.g., a sensor) may perform direct communication with other IoT devices (e.g., sensors) or other wireless devices 100a to 100f.

Wireless communication/connections 150a, 150b and 150c may be established between the wireless devices 100a to 100f and/or between wireless device 100a to 100f and BS 200 and/or between BSs 200. Herein, the wireless communication/connections may be established through various RATs (e.g., 5G NR) such as uplink/downlink communication 150a, sidelink communication (or device-to-device (D2D) communication) 150b, inter-base station communication 150c (e.g., relay, integrated access and backhaul (IAB)), etc. The wireless devices 100a to 100f and the BSs 200/the wireless devices 100a to 100f may transmit/receive radio signals to/from each other through the wireless communication/connections 150a, 150b and 150c. For example, the wireless communication/connections 150a, 150b and 150c may transmit/receive signals through various physical channels. To this end, at least a part of various configuration information configuring processes, various signal processing processes (e.g., channel encoding/decoding, modulation/demodulation, and resource mapping/de-mapping), and resource allocating processes, for transmitting/receiving radio signals, may be performed based on the various proposals of the present disclosure.

AI refers to the field of studying artificial intelligence or the methodology that can create it, and machine learning refers to the field of defining various problems addressed in the field of AI and the field of methodology to solve them. Machine learning is also defined as an algorithm that increases the performance of a task through steady experience on a task.

Robot means a machine that automatically processes or operates a given task by its own ability. In particular, robots with the ability to recognize the environment and make self-determination to perform actions can be called intelligent robots. Robots can be classified as industrial, medical, home, military, etc., depending on the purpose or area of use. The robot can perform a variety of physical operations, such as moving the robot joints with actuators or motors. The movable robot also includes wheels, brakes, propellers, etc., on the drive, allowing it to drive on the ground or fly in the air.

Autonomous driving means a technology that drives on its own, and autonomous vehicles mean vehicles that drive without user's control or with minimal user's control. For example, autonomous driving may include maintaining lanes in motion, automatically adjusting speed such as adaptive cruise control, automatic driving along a set route, and automatically setting a route when a destination is set. The vehicle covers vehicles equipped with internal combustion engines, hybrid vehicles equipped with internal combustion engines and electric motors, and electric vehicles equipped with electric motors, and may include trains, motorcycles, etc., as well as cars. Autonomous vehicles can be seen as robots with autonomous driving functions.

Extended reality is collectively referred to as VR, AR, and MR. VR technology provides objects and backgrounds of real world only through computer graphic (CG) images. AR technology provides a virtual CG image on top of a real object image. MR technology is a CG technology that combines and combines virtual objects into the real world. MR technology is similar to AR technology in that they show real and virtual objects together. However, there is a difference in that in AR technology, virtual objects are used as complementary forms to real objects, while in MR technology, virtual objects and real objects are used as equal personalities.

NR supports multiples numerologies (and/or multiple subcarrier spacings (SCS)) to support various 5G services. For example, if SCS is 15 kHz, wide area can be supported in traditional cellular bands, and if SCS is 30 kHz/60 kHz, dense-urban, lower latency, and wider carrier bandwidth can be supported. If SCS is 60 kHz or higher, bandwidths greater than 24.25 GHz can be supported to overcome phase noise.

The NR frequency band may be defined as two types of frequency range, i.e., FR1 and FR2. The numerical value of the frequency range may be changed. For example, the frequency ranges of the two types (FR1 and FR2) may be as shown in Table 1 below. For ease of explanation, in the frequency ranges used in the NR system, FR1 may mean "sub 6 GHz range", FR2 may mean "above 6 GHz range," and may be referred to as millimeter wave (mmW).

TABLE 1

| Frequency Range designation | Corresponding frequency range | Subcarrier Spacing |
|---|---|---|
| FR1 | 450 MHz-6000 MHz | 15, 30, 60 kHz |
| FR2 | 24250 MHz-52600 MHz | 60, 120, 240 kHz |

As mentioned above, the numerical value of the frequency range of the NR system may be changed. For example, FR1 may include a frequency band of 410 MHz to 7125 MHz as shown in Table 2 below. That is, FR1 may include a frequency band of 6 GHz (or 5850, 5900, 5925 MHz, etc.) or more. For example, a frequency band of 6 GHz (or 5850, 5900, 5925 MHz, etc.) or more included in FR1 may include an unlicensed band. Unlicensed bands may be used for a variety of purposes, for example for communication for vehicles (e.g., autonomous driving).

TABLE 2

| Frequency Range designation | Corresponding frequency range | Subcarrier Spacing |
|---|---|---|
| FR1 | 410 MHz-7125 MHz | 15, 30, 60 kHz |
| FR2 | 24250 MHz-52600 MHz | 60, 120, 240 kHz |

Figure 2:
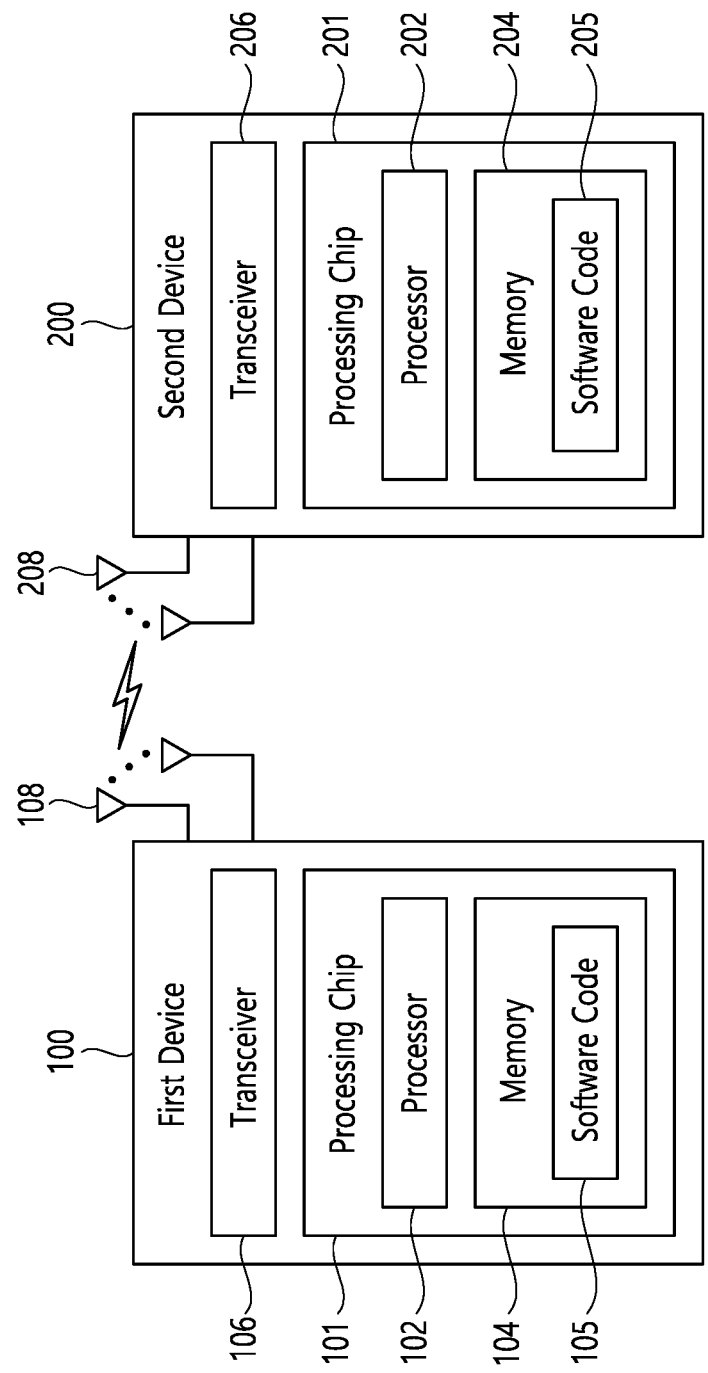
FIG. 2 shows an example of wireless devices to which implementations of the present disclosure is applied.

Here, the radio communication technologies implemented in the wireless devices in the present disclosure may include narrowband internet-of-things (NB-IoT) technology for low-power communication as well as LTE, NR and 6G. For example, NB-IoT technology may be an example of low power wide area network (LPWAN) technology, may be implemented in specifications such as LTE Cat NB1 and/or LTE Cat NB2, and may not be limited to the above-mentioned names. Additionally and/or alternatively, the radio communication technologies implemented in the wireless devices in the present disclosure may communicate based on LTE-M technology. For example, LTE-M technology may be an example of LPWAN technology and be called by various names such as enhanced machine type communication (eMTC). For example, LTE-M technology may be implemented in at least one of the various specifications, such as 1) LTE Cat 0, 2) LTE Cat M1, 3) LTE Cat M2, 4) LTE non-bandwidth limited (non-BL), 5) LTE-MTC, 6) LTE Machine Type Communication, and/or 7) LTE M, and may not be limited to the above-mentioned names. Additionally and/or alternatively, the radio communication technologies implemented in the wireless devices in the present disclosure may include at least one of ZigBee, Bluetooth, and/or LPWAN which take into account low-power communication, and may not be limited to the above-mentioned names. For example, ZigBee technology may generate personal area networks (PANs) associated with small/low-power digital communication based on various specifications such as IEEE 802.15.4 and may be called various names. FIG. 2 shows an example of wireless devices to which implementations of the present disclosure is applied.

Referring to FIG. 2, a first wireless device 100 and a second wireless device 200 may transmit/receive radio signals to/from an external device through a variety of RATs (e.g., LTE and NR).

In FIG. 2, {the first wireless device 100 and the second wireless device 200} may correspond to at least one of {the wireless device 100a to 100f and the BS 200}, {the wireless device 100*a* to 100*f* and the wireless device 100*a* to 100*f*} and/or {the BS 200 and the BS 200} of FIG. 1.

The first wireless device 100 may include at least one transceiver, such as a transceiver 106, at least one processing chip, such as a processing chip 101, and/or one or more antennas 108.

The processing chip 101 may include at least one processor, such a processor 102, and at least one memory, such as a memory 104. It is exemplarily shown in FIG. 2 that the memory 104 is included in the processing chip 101. Additional and/or alternatively, the memory 104 may be placed outside of the processing chip 101.

The processor 102 may control the memory 104 and/or the transceiver 106 and may be configured to implement the descriptions, functions, procedures, suggestions, methods and/or operational flowcharts described in the present disclosure. For example, the processor 102 may process information within the memory 104 to generate first information/signals and then transmit radio signals including the first information/signals through the transceiver 106. The processor 102 may receive radio signals including second information/signals through the transceiver 106 and then store information obtained by processing the second information/signals in the memory 104.

The memory 104 may be operably connectable to the processor 102. The memory 104 may store various types of information and/or instructions. The memory 104 may store a software code 105 which implements instructions that, when executed by the processor 102, perform the descriptions, functions, procedures, suggestions, methods and/or operational flowcharts disclosed in the present disclosure. For example, the software code 105 may implement instructions that, when executed by the processor 102, perform the descriptions, functions, procedures, suggestions, methods and/or operational flowcharts disclosed in the present disclosure. For example, the software code 105 may control the processor 102 to perform one or more protocols. For example, the software code 105 may control the processor 102 to perform one or more layers of the radio interface protocol.

Herein, the processor 102 and the memory 104 may be a part of a communication modem/circuit/chip designed to implement RAT (e.g., LTE or NR). The transceiver 106 may be connected to the processor 102 and transmit and/or receive radio signals through one or more antennas 108. Each of the transceiver 106 may include a transmitter and/or a receiver. The transceiver 106 may be interchangeably used with radio frequency (RF) unit(s). In the present disclosure, the first wireless device 100 may represent a communication modem/circuit/chip.

The second wireless device 200 may include at least one transceiver, such as a transceiver 206, at least one processing chip, such as a processing chip 201, and/or one or more antennas 208.

The processing chip 201 may include at least one processor, such a processor 202, and at least one memory, such as a memory 204. It is exemplarily shown in FIG. 2 that the memory 204 is included in the processing chip 201. Additional and/or alternatively, the memory 204 may be placed outside of the processing chip 201.

The processor 202 may control the memory 204 and/or the transceiver 206 and may be configured to implement the descriptions, functions, procedures, suggestions, methods and/or operational flowcharts described in the present disclosure. For example, the processor 202 may process information within the memory 204 to generate third information/signals and then transmit radio signals including the third information/signals through the transceiver 206. The processor 202 may receive radio signals including fourth information/signals through the transceiver 106 and then store information obtained by processing the fourth information/signals in the memory 204.

The memory 204 may be operably connectable to the processor 202. The memory 204 may store various types of information and/or instructions. The memory 204 may store a software code 205 which implements instructions that, when executed by the processor 202, perform the descriptions, functions, procedures, suggestions, methods and/or operational flowcharts disclosed in the present disclosure. For example, the software code 205 may implement instructions that, when executed by the processor 202, perform the descriptions, functions, procedures, suggestions, methods and/or operational flowcharts disclosed in the present disclosure. For example, the software code 205 may control the processor 202 to perform one or more protocols. For example, the software code 205 may control the processor 202 to perform one or more layers of the radio interface protocol.

Herein, the processor 202 and the memory 204 may be a part of a communication modem/circuit/chip designed to implement RAT (e.g., LTE or NR). The transceiver 206 may be connected to the processor 202 and transmit and/or receive radio signals through one or more antennas 208. Each of the transceiver 206 may include a transmitter and/or a receiver. The transceiver 206 may be interchangeably used with RF unit. In the present disclosure, the second wireless device 200 may represent a communication modem/circuit/chip.

Hereinafter, hardware elements of the wireless devices 100 and 200 will be described more specifically. One or more protocol layers may be implemented by, without being limited to, one or more processors 102 and 202. For example, the one or more processors 102 and 202 may implement one or more layers (e.g., functional layers such as physical (PHY) layer, media access control (MAC) layer, radio link control (RLC) layer, packet data convergence protocol (PDCP) layer, radio resource control (RRC) layer, and service data adaptation protocol (SDAP) layer). The one or more processors 102 and 202 may generate one or more protocol data units (PDUs) and/or one or more service data unit (SDUs) according to the descriptions, functions, procedures, suggestions, methods and/or operational flowcharts disclosed in the present disclosure. The one or more processors 102 and 202 may generate messages, control information, data, or information according to the descriptions, functions, procedures, suggestions, methods and/or operational flowcharts disclosed in the present disclosure. The one or more processors 102 and 202 may generate signals (e.g., baseband signals) including PDUs, SDUs, messages, control information, data, or information according to the descriptions, functions, procedures, suggestions, methods and/or operational flowcharts disclosed in the present disclosure and provide the generated signals to the one or more transceivers 106 and 206. The one or more processors 102 and 202 may receive the signals (e.g., baseband signals) from the one or more transceivers 106 and 206 and acquire the PDUs, SDUs, messages, control information, data, or information according to the descriptions, functions, procedures, suggestions, methods and/or operational flowcharts disclosed in the present disclosure.

The one or more processors 102 and 202 may be referred to as controllers, microcontrollers, microprocessors, or microcomputers. The one or more processors 102 and 202 may be implemented by hardware, firmware, software, or a combination thereof. As an example, one or more application specific integrated circuits (ASICs), one or more digital signal processors (DSPs), one or more digital signal processing devices (DSPDs), one or more programmable logic devices (PLDs), or one or more field programmable gate arrays (FPGAs) may be included in the one or more processors 102 and 202. The descriptions, functions, procedures, suggestions, methods and/or operational flowcharts disclosed in the present disclosure may be implemented using firmware or software and the firmware or software may be configured to include the modules, procedures, or functions. Firmware or software configured to perform the descriptions, functions, procedures, suggestions, methods and/or operational flowcharts disclosed in the present disclosure may be included in the one or more processors 102 and 202 or stored in the one or more memories 104 and 204 so as to be driven by the one or more processors 102 and 202. The descriptions, functions, procedures, suggestions, methods and/or operational flowcharts disclosed in the present disclosure may be implemented using firmware or software in the form of code, commands, and/or a set of commands.

The one or more memories 104 and 204 may be connected to the one or more processors 102 and 202 and store various types of data, signals, messages, information, programs, code, instructions, and/or commands. The one or more memories 104 and 204 may be configured by read-only memories (ROMs), random access memories (RAMs), electrically erasable programmable read-only memories (EPROMs), flash memories, hard drives, registers, cash memories, computer-readable storage media, and/or combinations thereof. The one or more memories 104 and 204 may be located at the interior and/or exterior of the one or more processors 102 and 202. The one or more memories 104 and 204 may be connected to the one or more processors 102 and 202 through various technologies such as wired or wireless connection.

The one or more transceivers 106 and 206 may transmit user data, control information, and/or radio signals/channels, mentioned in the descriptions, functions, procedures, suggestions, methods and/or operational flowcharts disclosed in the present disclosure, to one or more other devices. The one or more transceivers 106 and 206 may receive user data, control information, and/or radio signals/channels, mentioned in the descriptions, functions, procedures, suggestions, methods and/or operational flowcharts disclosed in the present disclosure, from one or more other devices. For example, the one or more transceivers 106 and 206 may be connected to the one or more processors 102 and 202 and transmit and receive radio signals. For example, the one or more processors 102 and 202 may perform control so that the one or more transceivers 106 and 206 may transmit user data, control information, or radio signals to one or more other devices. The one or more processors 102 and 202 may perform control so that the one or more transceivers 106 and 206 may receive user data, control information, or radio signals from one or more other devices.

The one or more transceivers 106 and 206 may be connected to the one or more antennas 108 and 208 and the one or more transceivers 106 and 206 may be configured to transmit and receive user data, control information, and/or radio signals/channels, mentioned in the descriptions, functions, procedures, suggestions, methods and/or operational flowcharts disclosed in the present disclosure, through the one or more antennas 108 and 208. In the present disclosure, the one or more antennas 108 and 208 may be a plurality of physical antennas or a plurality of logical antennas (e.g., antenna ports).

The one or more transceivers 106 and 206 may convert received user data, control information, radio signals/channels, etc., from RF band signals into baseband signals in order to process received user data, control information, radio signals/channels, etc., using the one or more processors 102 and 202. The one or more transceivers 106 and 206 may convert the user data, control information, radio signals/channels, etc., processed using the one or more processors 102 and 202 from the base band signals into the RF band signals. To this end, the one or more transceivers 106 and 206 may include (analog) oscillators and/or filters. For example, the one or more transceivers 106 and 206 can up-convert OFDM baseband signals to OFDM signals by their (analog) oscillators and/or filters under the control of the one or more processors 102 and 202 and transmit the up-converted OFDM signals at the carrier frequency. The one or more transceivers 106 and 206 may receive OFDM signals at a carrier frequency and down-convert the OFDM signals into OFDM baseband signals by their (analog) oscillators and/or filters under the control of the one or more processors 102 and 202.

In the implementations of the present disclosure, a UE may operate as a transmitting device in uplink (UL) and as a receiving device in downlink (DL). In the implementations of the present disclosure, a BS may operate as a receiving device in UL and as a transmitting device in DL. Hereinafter, for convenience of description, it is mainly assumed that the first wireless device 100 acts as the UE, and the second wireless device 200 acts as the BS. For example, the processor(s) 102 connected to, mounted on or launched in the first wireless device 100 may be configured to perform the UE behavior according to an implementation of the present disclosure or control the transceiver(s) 106 to perform the UE behavior according to an implementation of the present disclosure. The processor(s) 202 connected to, mounted on or launched in the second wireless device 200 may be configured to perform the BS behavior according to an implementation of the present disclosure or control the transceiver(s) 206 to perform the BS behavior according to an implementation of the present disclosure.

In the present disclosure, a BS is also referred to as a node B (NB), an eNode B (eNB), or a gNB.

Figure 3:
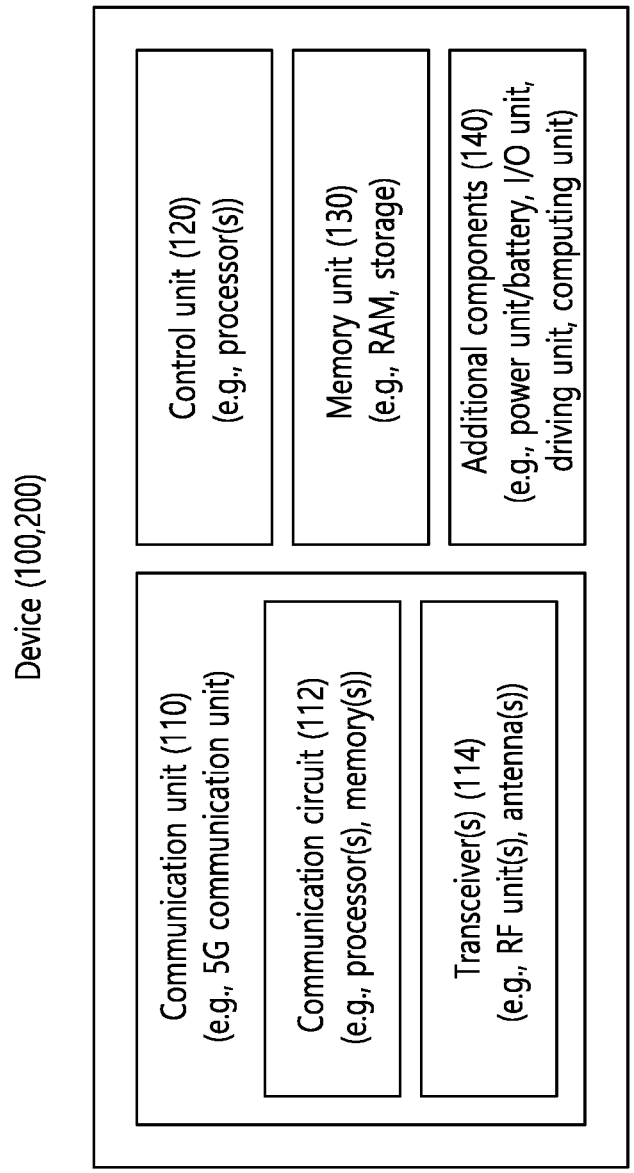
FIG. 3 shows an example of a wireless device to which implementations of the present disclosure is applied.

FIG. 3 shows an example of a wireless device to which implementations of the present disclosure is applied.

The wireless device may be implemented in various forms according to a use-case/service (refer to FIG. 1).

Referring to FIG. 3, wireless devices 100 and 200 may correspond to the wireless devices 100 and 200 of FIG. 2 and may be configured by various elements, components, units/portions, and/or modules. For example, each of the wireless devices 100 and 200 may include a communication unit 110, a control unit 120, a memory unit 130, and additional components 140. The communication unit 110 may include a communication circuit 112 and transceiver(s) 114. For example, the communication circuit 112 may include the one or more processors 102 and 202 of FIG. 2 and/or the one or more memories 104 and 204 of FIG. 2. For example, the transceiver(s) 114 may include the one or more transceivers 106 and 206 of FIG. 2 and/or the one or more antennas 108 and 208 of FIG. 2. The control unit 120 is electrically connected to the communication unit 110, the memory unit 130, and the additional components 140 and controls overall operation of each of the wireless devices 100 and 200. For example, the control unit 120 may control an electric/ mechanical operation of each of the wireless devices 100 and 200 based on programs/code/commands/information stored in the memory unit 130. The control unit 120 may transmit the information stored in the memory unit 130 to the exterior (e.g., other communication devices) via the communication unit 110 through a wireless/wired interface or store, in the memory unit 130, information received through the wireless/wired interface from the exterior (e.g., other communication devices) via the communication unit 110.

The additional components 140 may be variously configured according to types of the wireless devices 100 and 200. For example, the additional components 140 may include at least one of a power unit/battery, input/output (I/O) unit (e.g., audio I/O port, video I/O port), a driving unit, and a computing unit. The wireless devices 100 and 200 may be implemented in the form of, without being limited to, the robot (100*a* of FIG. 1), the vehicles (100*b*-1 and 100*b*-2 of FIG. 1), the XR device (100*c* of FIG. 1), the hand-held device (100*d* of FIG. 1), the home appliance (100*e* of FIG. 1), the IoT device (100*f* of FIG. 1), a digital broadcast terminal, a hologram device, a public safety device, an MTC device, a medicine device, a FinTech device (or a finance device), a security device, a climate/environment device, the AI server/device (400 of FIG. 1), the BSs (200 of FIG. 1), a network node, etc. The wireless devices 100 and 200 may be used in a mobile or fixed place according to a use-example/service.

In FIG. 3, the entirety of the various elements, components, units/portions, and/or modules in the wireless devices 100 and 200 may be connected to each other through a wired interface or at least a part thereof may be wirelessly connected through the communication unit 110. For example, in each of the wireless devices 100 and 200, the control unit 120 and the communication unit 110 may be connected by wire and the control unit 120 and first units (e.g., 130 and 140) may be wirelessly connected through the communication unit 110. Each element, component, unit/portion, and/or module within the wireless devices 100 and 200 may further include one or more elements. For example, the control unit 120 may be configured by a set of one or more processors. As an example, the control unit 120 may be configured by a set of a communication control processor, an application processor (AP), an electronic control unit (ECU), a graphical processing unit, and a memory control processor. As another example, the memory unit 130 may be configured by a RAM, a DRAM, a ROM, a flash memory, a volatile memory, a non-volatile memory, and/or a combination thereof.

Figure 4:
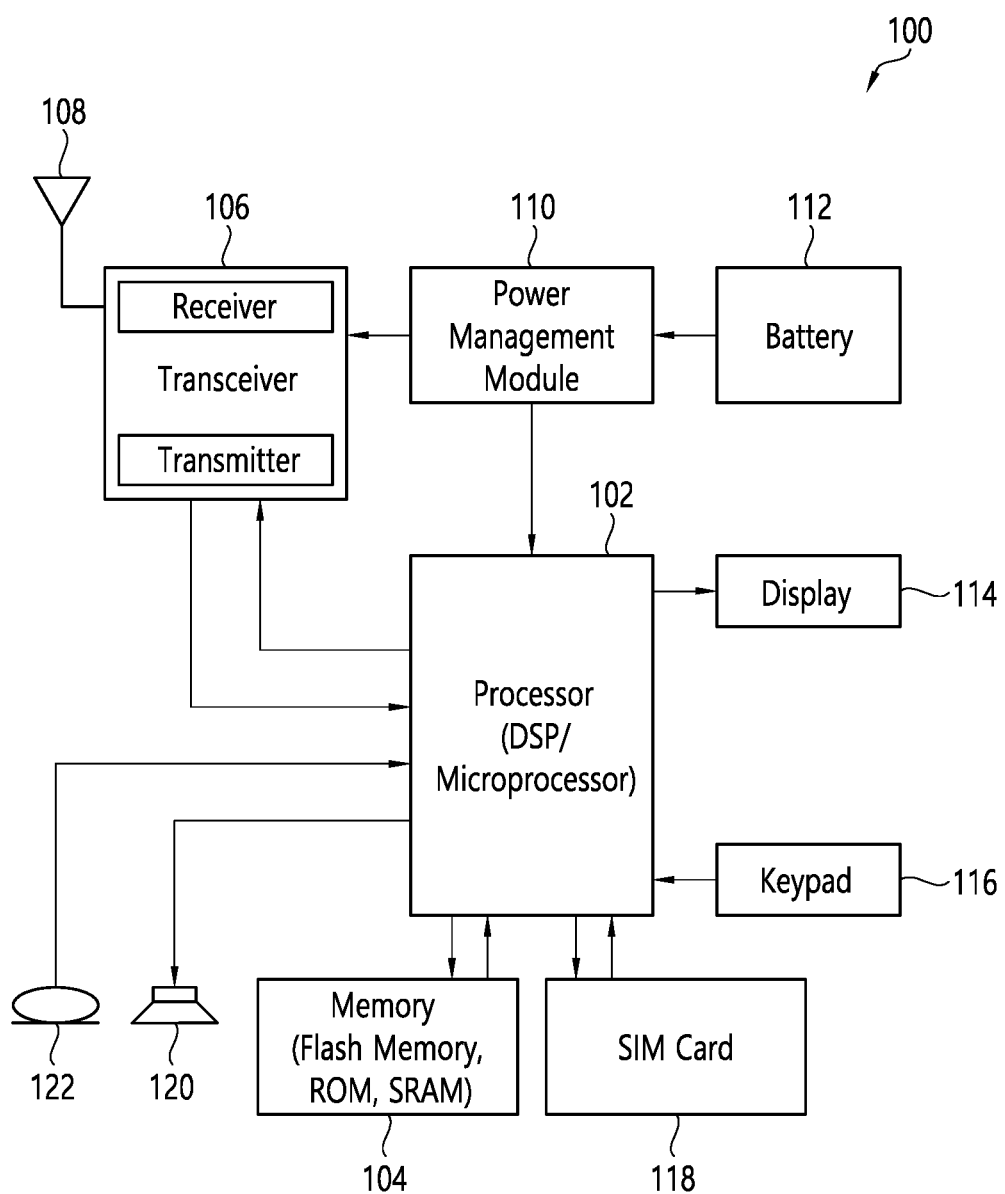
FIG. 4 shows an example of UE to which implementations of the present disclosure is applied.

FIG. 4 shows an example of UE to which implementations of the present disclosure is applied.

Referring to FIG. 4, a UE 100 may correspond to the first wireless device 100 of FIG. 2 and/or the wireless device 100 or 200 of FIG. 3.

A UE 100 includes a processor 102, a memory 104, a transceiver 106, one or more antennas 108, a power management module 110, a battery 112, a display 114, a keypad 116, a subscriber identification module (SIM) card 118, a speaker 120, and a microphone 122.

The processor 102 may be configured to implement the descriptions, functions, procedures, suggestions, methods and/or operational flowcharts disclosed in the present disclosure. The processor 102 may be configured to control one or more other components of the UE 100 to implement the descriptions, functions, procedures, suggestions, methods and/or operational flowcharts disclosed in the present disclosure. Layers of the radio interface protocol may be implemented in the processor 102. The processor 102 may include ASIC, other chipset, logic circuit and/or data processing device. The processor 102 may be an application processor. The processor 102 may include at least one of a digital signal processor (DSP), a central processing unit (CPU), a graphics processing unit (GPU), a modem (modulator and demodulator). An example of the processor 102 may be found in SNAPDRAGON™ series of processors made by Qualcomm®, EXYNOS™ series of processors made by Samsung®, A series of processors made by Apple®, HELIO™ series of processors made by MediaTek ATOM™ series of processors made by Intel® or a corresponding next generation processor.

The memory 104 is operatively coupled with the processor 102 and stores a variety of information to operate the processor 102. The memory 104 may include ROM, RAM, flash memory, memory card, storage medium and/or other storage device. When the embodiments are implemented in software, the techniques described herein can be implemented with modules (e.g., procedures, functions, etc.) that perform the descriptions, functions, procedures, suggestions, methods and/or operational flowcharts disclosed in the present disclosure. The modules can be stored in the memory 104 and executed by the processor 102. The memory 104 can be implemented within the processor 102 or external to the processor 102 in which case those can be communicatively coupled to the processor 102 via various means as is known in the art.

The transceiver 106 is operatively coupled with the processor 102, and transmits and/or receives a radio signal. The transceiver 106 includes a transmitter and a receiver. The transceiver 106 may include baseband circuitry to process radio frequency signals. The transceiver 106 controls the one or more antennas 108 to transmit and/or receive a radio signal.

The power management module 110 manages power for the processor 102 and/or the transceiver 106. The battery 112 supplies power to the power management module 110.

The display 114 outputs results processed by the processor 102. The keypad 116 receives inputs to be used by the processor 102. The keypad 116 may be shown on the display 114.

The SIM card 118 is an integrated circuit that is intended to securely store the international mobile subscriber identity (IMSI) number and its related key, which are used to identify and authenticate subscribers on mobile telephony devices (such as mobile phones and computers). It is also possible to store contact information on many SIM cards.

The speaker 120 outputs sound-related results processed by the processor 102. The microphone 122 receives sound-related inputs to be used by the processor 102.

Figure 5:
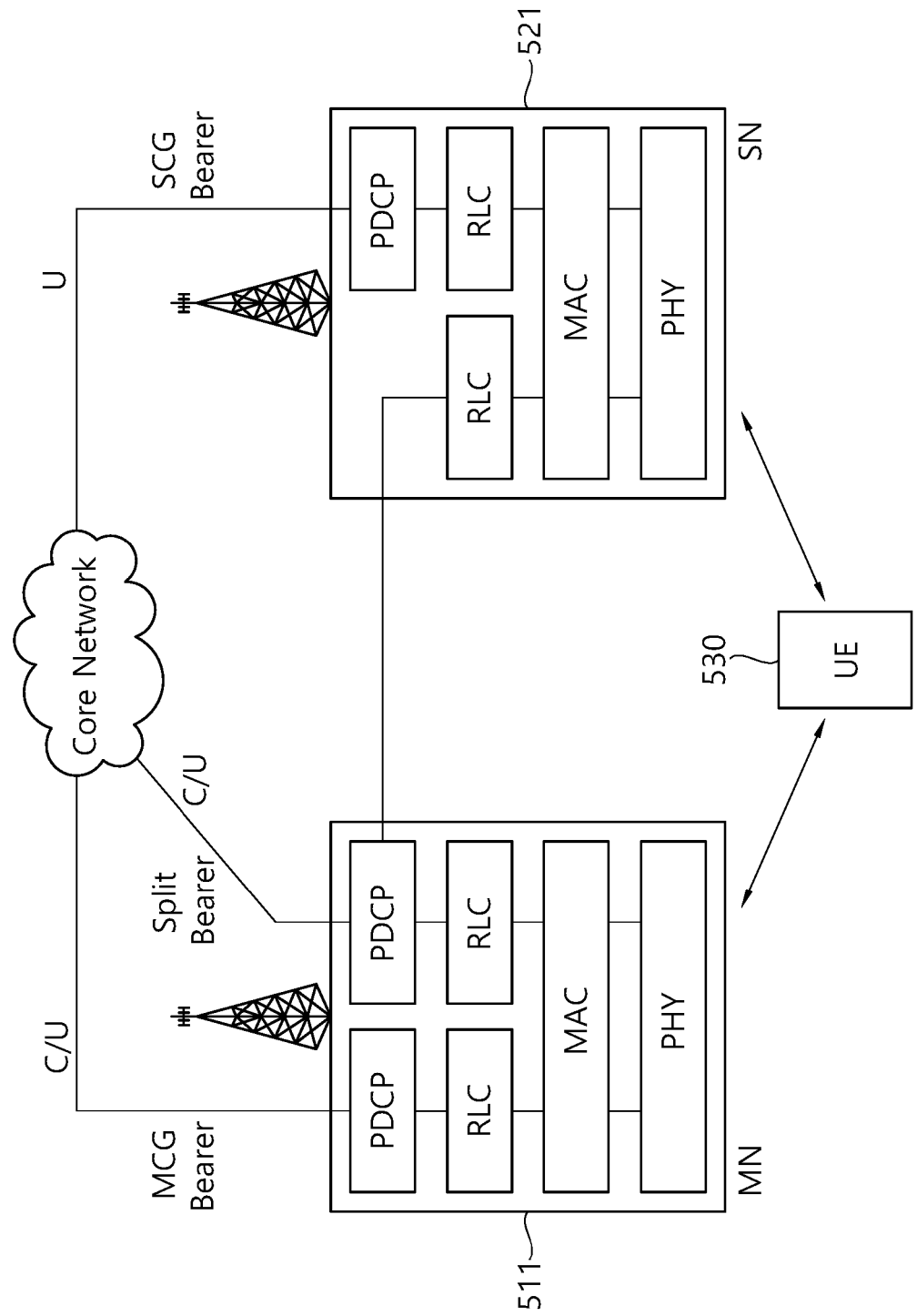
FIG. 5 shows an example of a dual connectivity (DC) architecture to which technical features of the present disclosure can be applied.

FIG. 5 shows an example of a dual connectivity (DC) architecture to which technical features of the present disclosure can be applied.

Referring to FIG. 5, MN 511, SN 521, and a UE 530 communicating with both the MN 511 and the SN 521 are illustrated. As illustrated in FIG. 5, DC refers to a scheme in which a UE (e.g., UE 530) utilizes radio resources provided by at least two RAN nodes comprising a MN (e.g., MN 511) and one or more SNs (e.g., SN 521). In other words, DC refers to a scheme in which a UE is connected to both the MN and the one or more SNs, and communicates with both the MN and the one or more SNs. Since the MN and the SN may be in different sites, a backhaul between the MN and the SN may be construed as non-ideal backhaul (e.g., relatively large delay between nodes).

MN (e.g., MN 511) refers to a main RAN node providing services to a UE in DC situation. SN (e.g., SN 521) refers to an additional RAN node providing services to the UE with the MN in the DC situation. If one RAN node provides services to a UE, the RAN node may be a MN. SN can exist if MN exists.

For example, the MN may be associated with macro cell whose coverage is relatively larger than that of a small cell. However, the MN does not have to be associated with macro cell—that is, the MN may be associated with a small cell. Throughout the disclosure, a RAN node that is associated with a macro cell may be referred to as 'macro cell node'. MN may comprise macro cell node.

For example, the SN may be associated with small cell (e.g., micro cell, pico cell, femto cell) whose coverage is relatively smaller than that of a macro cell. However, the SN does not have to be associated with small cell—that is, the SN may be associated with a macro cell. Throughout the disclosure, a RAN node that is associated with a small cell may be referred to as 'small cell node'. SN may comprise small cell node.

The MN may be associated with a master cell group (MCG). MCG may refer to a group of serving cells associated with the MN, and may comprise a primary cell (PCell) and optionally one or more secondary cells (SCells). User plane data and/or control plane data may be transported from a core network to the MN through a MCG bearer. MCG bearer refers to a bearer whose radio protocols are located in the MN to use MN resources. As shown in FIG. 5, the radio protocols of the MCG bearer may comprise PDCP, RLC, MAC and/or PHY.

The SN may be associated with a secondary cell group (SCG). SCG may refer to a group of serving cells associated with the SN, and may comprise a primary secondary cell (PSCell) and optionally one or more SCells. User plane data may be transported from a core network to the SN through a SCG bearer. SCG bearer refers to a bearer whose radio protocols are located in the SN to use SN resources. As shown in FIG. 5, the radio protocols of the SCG bearer may comprise PDCP, RLC, MAC and PHY.

User plane data and/or control plane data may be transported from a core network to the MN and split up/duplicated in the MN, and at least part of the split/duplicated data may be forwarded to the SN through a split bearer. Split bearer refers to a bearer whose radio protocols are located in both the MN and the SN to use both MN resources and SN resources. As shown in FIG. 5, the radio protocols of the split bearer located in the MN may comprise PDCP, RLC, MAC and PHY. The radio protocols of the split bearer located in the SN may comprise RLC, MAC and PHY.

According to various embodiments, PDCP anchor/PDCP anchor point/PDCP anchor node refers to a RAN node comprising a PDCP entity which splits up and/or duplicates data and forwards at least part of the split/duplicated data over X2/Xn interface to another RAN node. In the example of FIG. 5, PDCP anchor node may be MN.

According to various embodiments, the MN for the UE may be changed. This may be referred to as handover, or a MN handover.

According to various embodiments, a SN may newly start providing radio resources to the UE, establishing a connection with the UE, and/or communicating with the UE (i.e., SN for the UE may be newly added). This may be referred to as a SN addition.

According to various embodiments, a SN for the UE may be changed while the MN for the UE is maintained. This may be referred to as a SN change.

According to various embodiments, DC may comprise E-UTRAN NR-DC (EN-DC), and/or multi-radio access technology (RAT)-DC (MR-DC). EN-DC refers to a DC situation in which a UE utilizes radio resources provided by E-UTRAN node and NR RAN node. MR-DC refers to a DC situation in which a UE utilizes radio resources provided by RAN nodes with different RATs.

Hereinafter, signalling radio bearer (SRB) is described.

Signalling radio bearer may be defined as a radio bearer (RB) that is used only for a transmission of RRC and/or NAS messages. More specifically, the following SRBs may be defined:

SRB0 may be used for RRC messages using the CCCH logical channel;

SRB1 may be used for for RRC messages (which may include a piggybacked NAS message) as well as for NAS messages prior to the establishment of SRB2, all using DCCH logical channel;

SRB2 may be used for NAS messages and for RRC messages which include logged measurement information, all using DCCH logical channel. SRB2 has a lower priority than SRB1 and may be configured by the network after AS security activation; and SRB3 may be used for specific RRC messages when UE is in DC (e.g., (NG)EN-DC and/or NR-DC), all using DCCH logical channel.

In downlink, piggybacking of NAS messages may be used only for one dependant (i.e. with joint success/failure) procedure: bearer establishment/modification/release. In uplink, piggybacking of NAS message may be used only for transferring the initial NAS message during connection setup and connection resume.

The NAS messages transferred via SRB2 may also be contained in RRC messages, which however do not include any RRC protocol control information.

Once AS security is activated, all RRC messages on SRB1, SRB2 and SRB3, including those containing NAS messages, may be integrity protected and ciphered by PDCP. NAS may independently apply integrity protection and ciphering to the NAS messages.

Split SRB may be supported for all the MR-DC options in both SRB1 and SRB2 (split SRB may not be supported for SRB0 and SRB3).

For operation with shared spectrum channel access, SRB0, SRB1 and SRB3 may be assigned with the highest priority Channel Access Priority Class (CAPC), (i.e. CAPC=1) while CAPC for SRB2 is configurable.

Figure 6:
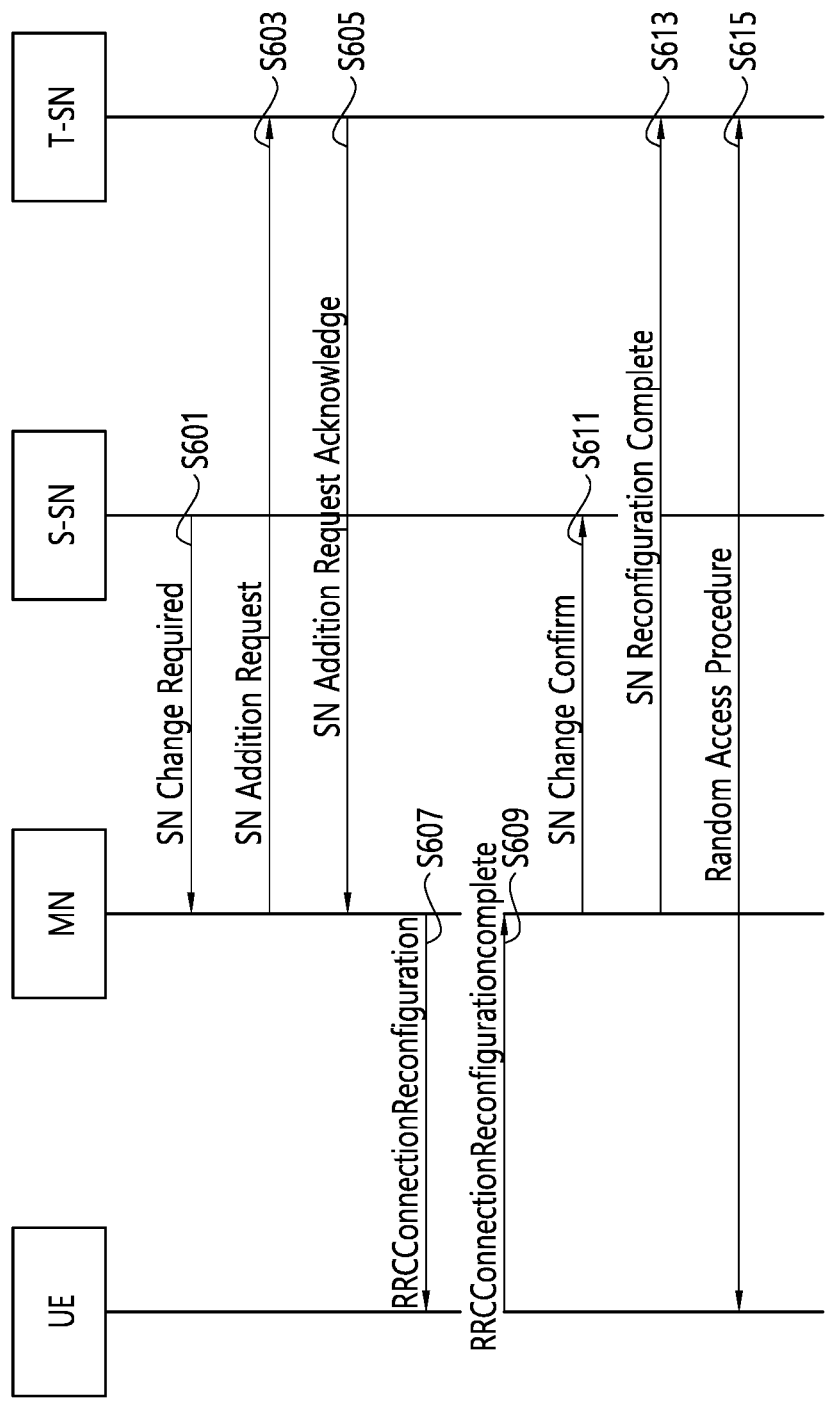
FIG. 6 shows an example of a SN change procedure to which technical features of the present disclosure can be applied.

FIG. 6 shows an example of a SN change procedure to which technical features of the present disclosure can be applied.

Steps illustrated in FIG. 6 may be related to an SN-initiated SN change procedure. The SN initiated SN change procedure may be used to transfer a UE context from a source SN to a target SN and to change a SCG configuration in UE from one SN to another.

Referring to FIG. 6, in step S601, the source SN may initiate the SN change procedure by sending a SN Change Required message, which contains a candidate target node ID and may include the SCG configuration (to support delta configuration) and measurement results related to the target SN.

In step S603, the MN may transmit SN addition request message to the target SN. The MN may request the target SN to allocate resources for the UE by means of the SN Addition procedure, including the measurement results related to the target SN received from the source SN.

In step S605, the target SN may transmit SN addition request acknowledgement (ACK) message to the MN. If data forwarding is needed, the target SN may provide data forwarding addresses to the MN. The target SN may include the indication of the full or delta RRC configuration.

In step S607, the MN may trigger the UE to apply the new configuration. The MN may indicate the new configuration to the UE in the MN RRC reconfiguration message including the SN RRC reconfiguration message generated by the target SN.

In step S609, the UE may apply the new configuration and send the MN RRC reconfiguration complete message, including the SN RRC response message for the target SN, if needed. In case the UE is unable to comply with (part of) the configuration included in the MN RRC reconfiguration message, the UE may perform the reconfiguration failure procedure.

In step S611, if the allocation of target SN resources was successful, the MN may confirm the change of the source SN. If data forwarding is needed, the MN may provide data forwarding addresses to the source SN. If direct data forwarding is used for SN terminated bearers, the MN may provide data forwarding addresses as received from the target SN to source SN. Reception of the SN Change Confirm message may trigger the source SN to stop providing user data to the UE and, if applicable, to start data forwarding.

In step S613, if the RRC connection reconfiguration procedure was successful, the MN may inform the target SN via SN Reconfiguration Complete message with the included SN RRC response message for the target SN, if received from the UE.

In step S615, the UE may synchronize to the target SN.

After step S615, if PDCP termination point is changed for bearers using RLC AM, the source SN may send the SN Status Transfer, which the MN sends then to the target SN, if needed.

If applicable, data forwarding from the source SN may take place. The data forwarding from the source SN may be initiated as early as the source SN receives the SN Change Confirm message from the MN.

The source SN may send the Secondary RAT Data Usage Report message to the MN and include the data volumes delivered to and received from the UE. The SN may send the Secondary RAT Data Usage Report message when the transmission of the related QoS flow is stopped.

If applicable, a PDU Session path update procedure may be triggered by the MN.

Upon reception of the UE Context Release message, the source SN may release radio and C-plane related resources associated to the UE context. Any ongoing data forwarding may continue.

Figure 7:
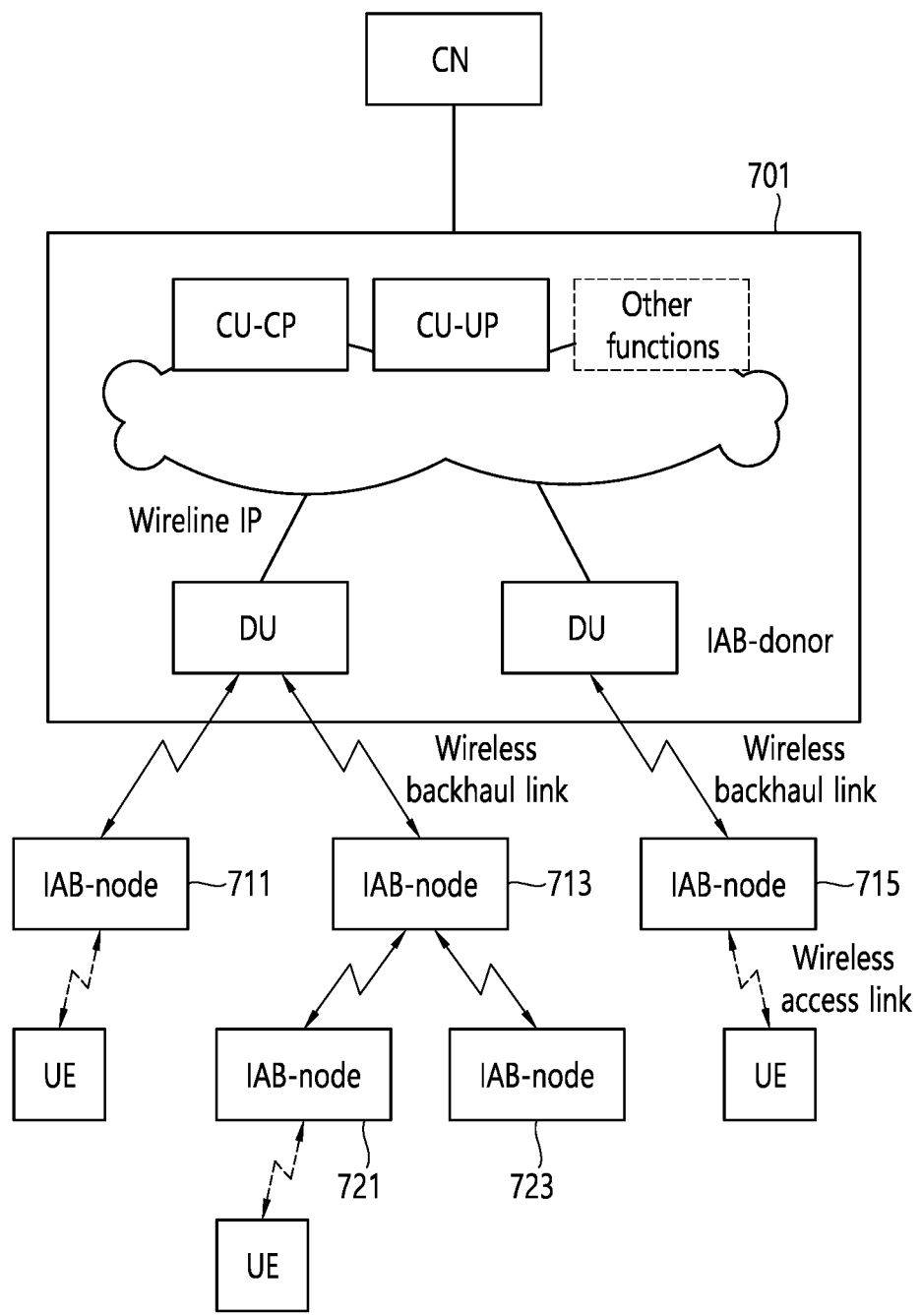
FIG. 7 shows an example of IAB topology to which technical features of the present disclosure can be applied.

FIG. 7 shows an example of IAB topology to which technical features of the present disclosure can be applied.

Referring to FIG. 7, the IAB topology may comprise an IAB donor 701 and multiple IAB nodes 711, 713, 715, 721 and 723. "IAB donor node (or, simply IAB donor)" refers to a RAN node which provides UE's interface to core network (CN) and wireless backhauling functionalities to IAB nodes. The IAB donor 701 may be treated as a signal logical node that may comprise a set of functions such as DU, CU-CP, CU-UP and potentially other functions. In a deployment, the IAB donor can be split according to these functions, which can all be either collocated or non-collocated. Also, some of the functions presently associated with the IAB donor may eventually be moved outside of the IAB donor in case it becomes evident that the functions do not perform IAB-specific tasks.

The IAB donor 701 may be connected to the IAB node 711, 713 and 715 via wireless backhaul link (hereinafter, the terms "wireless backhaul link" and "wireless backhaul channel" can be used interchangeably), and may communicate with the IAB node 711, 713 and/or 715 via the wireless backhaul link. For example, DUs of the IAB donor 701 may be used to communicate with the IAB nodes 711, 713 and/or 715 via wireless backhaul link. Each of the IAB node 711 and 715 may communicate with a UE served by itself via wireless access link (hereinafter, the term "wireless access link and wireless access channel can be used interchangeably). Further, the IAB donor 701 may be a parent node for the IAB node 711, 713 and 715, and the IAB node 711, 713 and 715 may be a child node for the IAB donor 701. The definition of the parent node and the child node will be described later.

The IAB node 713 may be connected to IAB node 721 and 723 via wireless backhaul link, and may communicate with the IAB node 721 and/or 723 via wireless backhaul link. The IAB node 721 may communicate with a UE served by itself via wireless access link. Further, the IAB node 713 may be a parent node for the IAB node 721 and 723, and the IAB node 721 and 723 may be a child node for the IAB node 713.

The IAB nodes 711, 713 and 715 may directly communicate with IAB donor 701 via wireless backhaul link. Therefore, the distance between the IAB donor 701 and each of the IAB nodes 711, 713 and 715 may be expressed as 1-hop distance. The IAB donor 701 may be 1-hop parent node for the IAB nodes 711, 713 and 715, and the IAB nodes 711, 713 and 715 may be 1-hop child node for the IAB donor 701.

The IAB nodes 721 and 723 may communicate with the IAB donor 701 via a first wireless backhaul link and a second wireless backhaul link. The first wireless backhaul link may be a wireless backhaul link between i) the IAB node 713 ii) the IAB nodes 721 and/or 723. The second wireless backhaul link may be a wireless backhaul link between the IAB node 713 and the IAB donor 701. Therefore, the distance between the IAB donor 701 and each of the IAB nodes 721 and 723 may be expressed as 2-hop distance. The IAB donor 701 may be 2-hop parent node for the IAB nodes 721 and 723, and the IAB nodes 721 and 723 may be 2-hop child node for the IAB donor 701. In a similar way, N-hop distance may be defined between arbitrary IAB nodes (including or not including IAB donor), and thus, N-hop parent node and N-hop child node may also be defined.

All IAB nodes may support an IAB function which is a function to communicate with another IAB node via a wireless backhaul channel.

Figure 8:
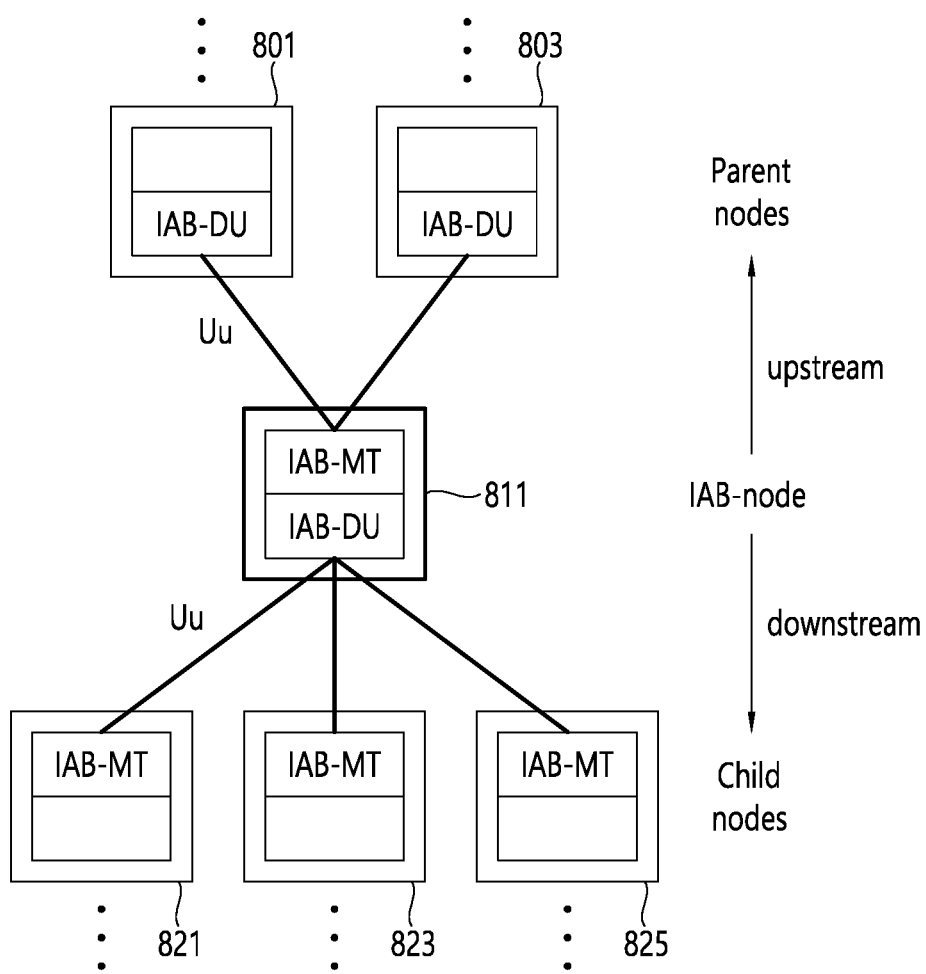
FIG. 8 shows a parent and child node relationship for IAB node to which technical features of the present disclosure can be applied.

FIG. 8 shows a parent and child node relationship for IAB node to which technical features of the present disclosure can be applied.

Referring to FIG. 8, an IAB node 811 may be connected to parent nodes 801 and 803 via wireless backhaul links, and may be connected to child nodes 821, 823 and 825 via wireless backhaul links. Throughout the disclosure, "parent IAB node (or, simply parent node)" for an IAB node may be defined as a next hop neighbor node with respect to an IAB-mobile termination (IAB-MT, or simply MT) of the IAB node. That is, the neighbor node on the IAB-MT's interface may be referred to as a parent node. The parent node can be IAB node or IAB donor-DU. Further, "child IAB node (or, simply child node)" for an IAB node may be defined as a next hop neighbor node with respect to an IAB-DU (or, simply DU) of the IAB node. That is, the neighbor node on the IAB-DU's interface may be referred to as a child node.

IAB-MT may refer to an IAB node function that terminates the Uu interface to the parent node. IAB-DU may refer to a gNB-DU functionality supported by the IAB node to terminate the access interface to UEs and next-hop IAB nodes, and/or to terminate the F1 protocol to the gNB-CU functionality on the IAB donor.

The direction toward the child node may be referred to as downstream while the direction toward the parent node may be referred to as upstream. Further, a backhaul link between an IAB node and a parent node for the IAB node may be referred to as upward backhaul link for the IAB node. A backhaul link between an IAB node and a child node for the IAB node may be referred to as downward backhaul link for the IAB node. A backhaul link for an IAB node may comprise at least one of an upward backhaul link for the IAB node, or a downward backhaul link for the IAB node.

Figure 9:
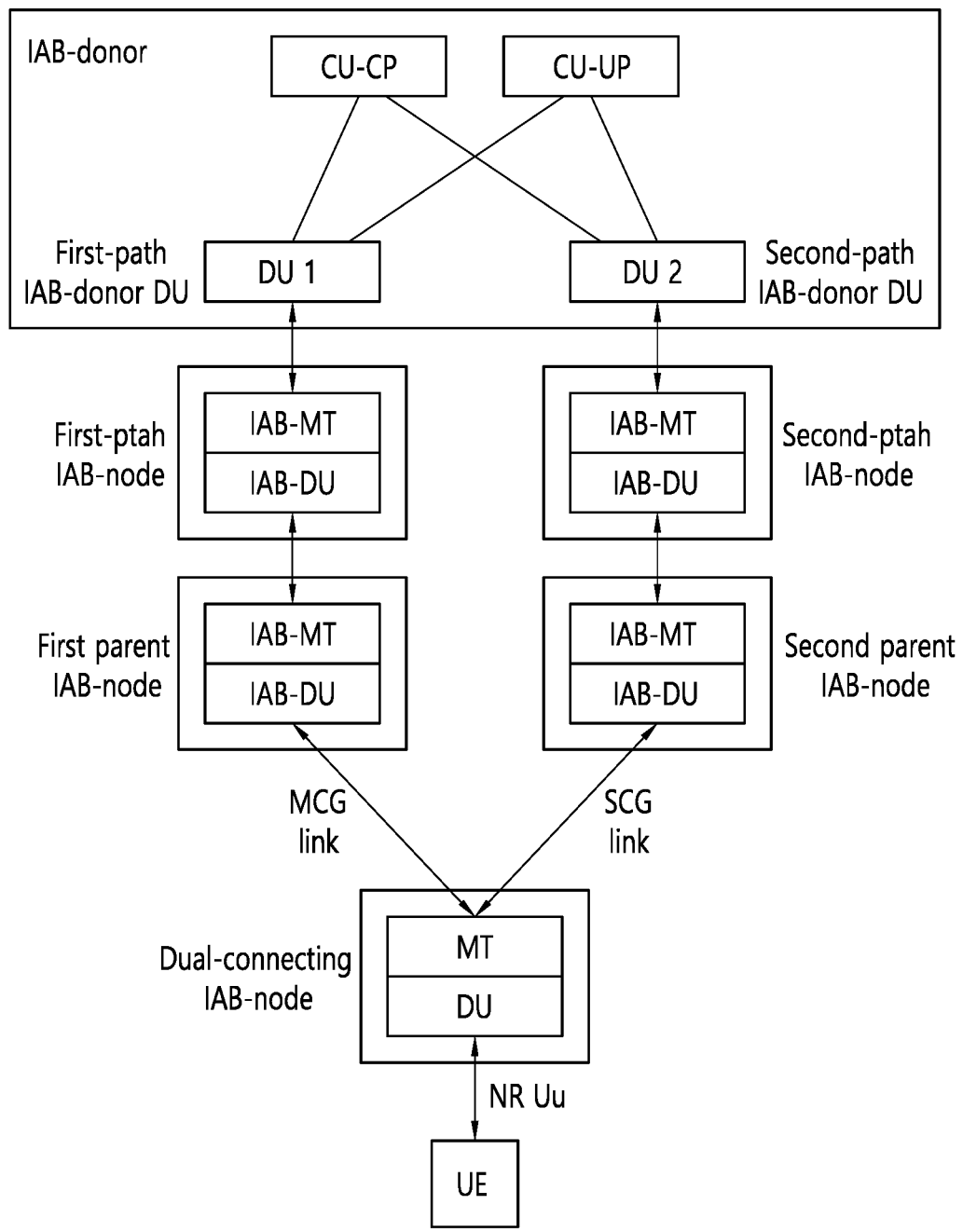
FIG. 9 shows an example of IAB topology with two redundant paths to which technical features of the present disclosure can be applied.

FIG. 9 shows an example of IAB topology with two redundant paths to which technical features of the present disclosure can be applied.

Referring to FIG. 9, an IAB donor may comprise central unit (CU)-control plane (CP), CU-user plane (UP), distributed unit 1 (DU1) and DU2. DU1 may be associated with a first path, and therefore, DU1 may also be referred to as first path IAB donor DU. DU2 may be associated with a second path, and therefore, DU2 may also be referred to as second path IAB donor DU. DU1 may have a child node on the first path (i.e., first path IAB node), and DU2 may have a child node on the second path (i.e., second path IAB node).

Further, there may be a dual connecting IAB node, which is served by a first parent IAB node on the first path, and a second parent IAB node on the second path in DC. That is, the dual connecting IAB node may have two paths with the IAB donor via different IAB donor DUs. The dual connecting IAB node may communicate with a UE via NR Uu interface.

The first parent IAB node may be MN and associated with MCG. A parent node for the first parent IAB node may be the first path IAB node, and a child node for the first parent IAB node may be the dual connecting IAB node. The first parent IAB node may communicate with the dual connecting IAB node via MCG link.

The second parent IAB node may be SN and associated with SCG. A parent node for the second parent IAB node may be the second path IAB node, and a child node for the second parent IAB node may be the dual connecting IAB node. The second parent IAB node may communicate with the dual connecting IAB node via SCG link.

As illustrated in FIG. 9, redundant paths may be established in the IAB topology underneath the same IAB donor CU. The redundant paths may use different IAB-donor-DUs. The redundant paths may also have common nodes with each other. The topological redundancy may use NR-DC for the IAB-MT, and may be supported for IAB-nodes operating in standalone (SA) mode.

Figure 10:
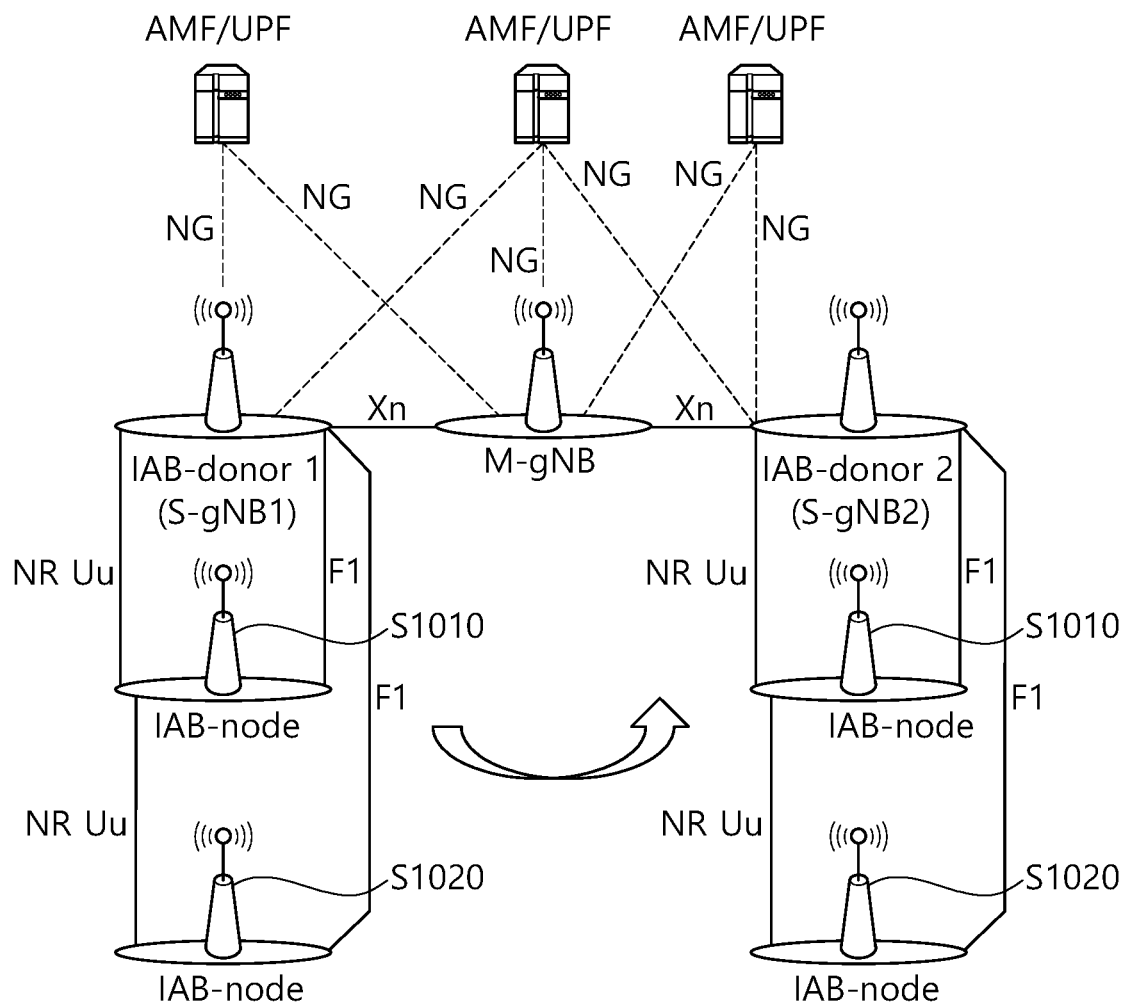
FIG. 10 shows an example of an IAB node change to which technical features of the present disclosure can be applied.

FIG. 10 shows an example of an IAB node change to which technical features of the present disclosure can be applied.

Referring to FIG. 10, IAB node 1010 may be currently served by MN and IAB donor 1 as SN in DC. The IAB node 1010 may currently have a child node, IAB node 1020.

After a while, there may be a case that SN for the IAB node 1010 needs to be changed from the IAB donor 1 to IAB donor 2, while maintaining the MN for the IAB node 1010 and keeping the IAB node 1020 as a child node. That is, there may be a case that the IAB node 1010 needs to perform SN change from the IAB donor 1 to the IAB donor 2 while keeping the IAB node 1020 as a child node.

After performing the SN change from a source SN to a target SN (i.e., from the IAB donor 1 to the IAB donor 2), the IAB node 1010 may be served by the MN and the IAB donor 2 as SN, and may still have the IAB node 1020 as a child node.

As described above, mobility scenario for IAB node may need to be considered. In specific, how to perform SN change for IAB node in DC may need to be considered.

The following drawings are created to explain specific embodiments of the present disclosure. The names of the specific devices or the names of the specific signals/messages/fields shown in the drawings are provided by way of example, and thus the technical features of the present disclosure are not limited to the specific names used in the following drawings.

Figure 11:
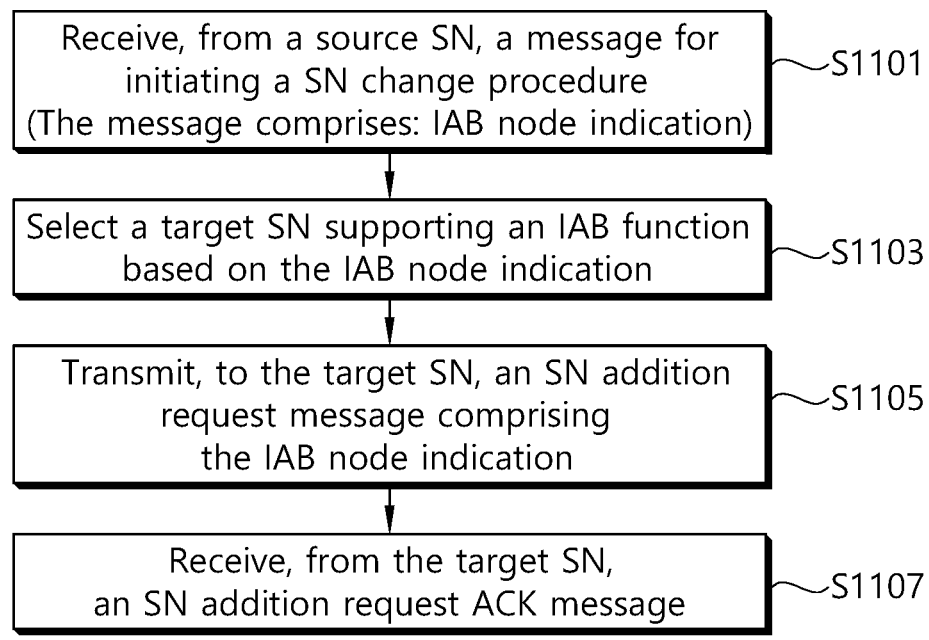
FIG. 11 shows an example of a method for IAB node change procedure according to an embodiment of the present disclosure.

FIG. 11 shows an example of a method for IAB node change procedure according to an embodiment of the present disclosure. Steps illustrated in FIG. 11 may be performed by MN serving a wireless device with SN in DC.

Referring to FIG. 11, in step S1101, the MN may receive, from a source SN, a message for initiating a SN change procedure. The message may comprise an IAB node indication informing that the SN change procedure is related to a mobility of an IAB node. The message may be a SN change required message.

In step S1103, the MN may select a target SN supporting an IAB function based on the IAB node indication. The IAB function may be a function to communicate with an IAB node via a wireless backhaul channel.

In step S1105, the MN may transmit, to the target SN, an SN addition request message comprising the IAB node indication.

In step S1107, the MN may receive, from the target SN, an SN addition request acknowledge message.

The IAB node indication in the message may instruct the MN to select a target SN supporting the IAB function among candidate target SNs for SN change. The IAB node indication in the SN addition request message may inform that controlling of radio resources for an IAB node rather than that for a UE is to be performed.

The message and/or the SN change required message may comprise at least one of identities (IDs) of candidate target SNs for SN change, secondary cell group (SCG) configurations related to the candidate target SNs, or measurement results related to the candidate target SNs.

To select the target SN, the MN may identify at least one candidate target SN of which ID informs that the IAB function is supported among the candidate target SNs based on the IAB node indication. The MN may select the target SN among the at least one candidate target SN based on a measurement result related to the at least one candidate target SN. For example, the MN may select the target SN whose cell quality indicated by the measurement result is the highest among the at least one candidate target SN.

The wireless device may comprise an IAB node performing an SN change from the source SN to the target SN.

Figure 12:
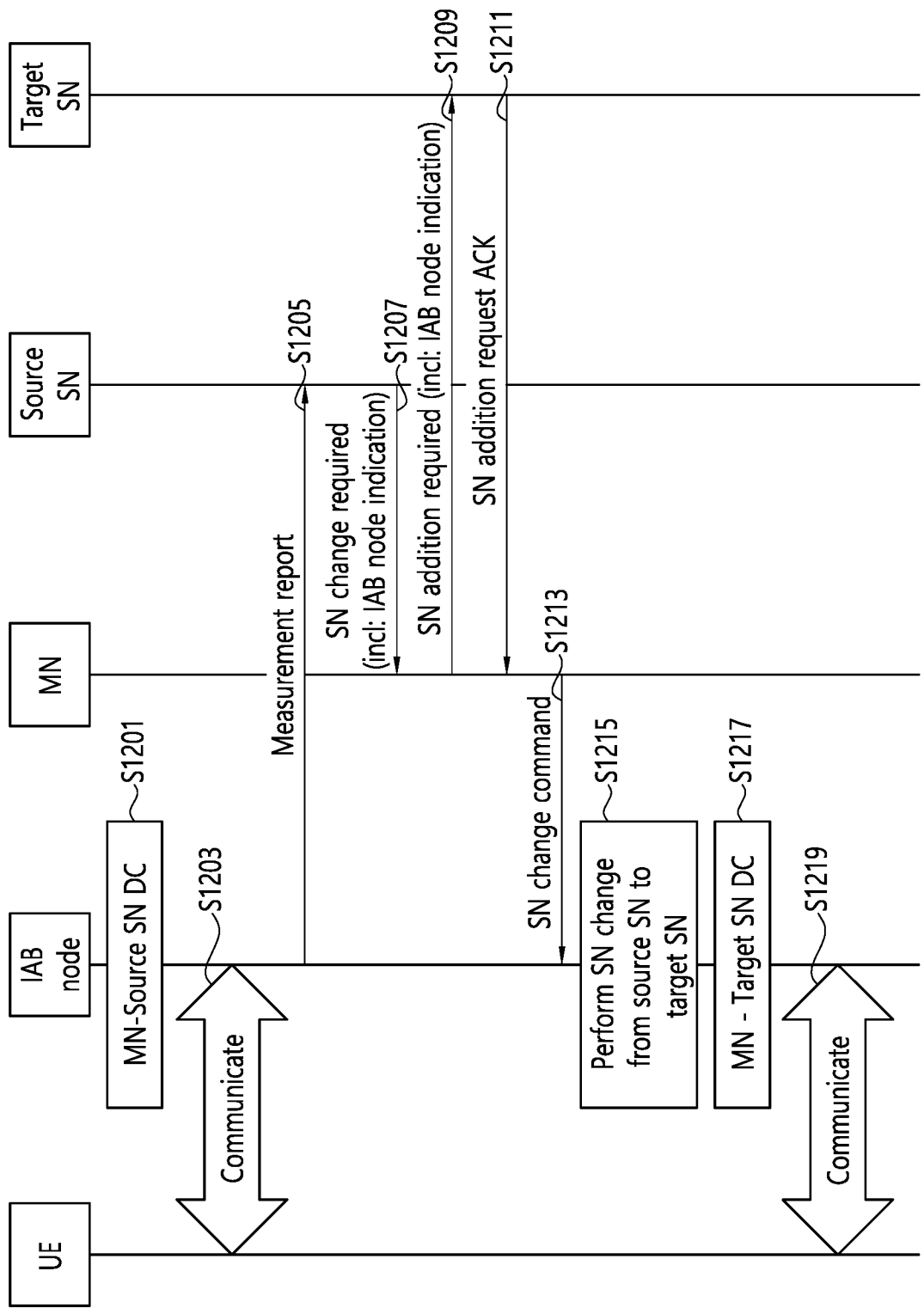
FIG. 12 shows an example of a signal flow for IAB node change procedure according to an embodiment of the present disclosure.

FIG. 12 shows an example of a signal flow for IAB node change procedure according to an embodiment of the present disclosure.

Referring to FIG. 12, in step S1201, an IAB node may be served by a MN and a source SN in DC.

In step S1203, a UE may perform a communication via the IAB node which is served by a MN and a source SN in DC.

In step S1205, the IAB node may transmit a measurement report to the source SN. The source SN may determine whether to perform an SN change for the IAB node based on the measurement report.

In step S1207, the MN may receive, from the source SN, a SN change required message comprising an IAB node indication. The SN change required message may be a message for initiating a SN change procedure. The IAB node indication may inform that the SN change procedure is related to a mobility of an IAB node. Then, the MN may select a target SN supporting an IAB function based on the IAB node indication. The IAB function may be a function to communicate with an IAB node via a wireless backhaul channel.

In step S1209, the MN may transmit, to the target SN, an SN addition request message comprising the IAB node indication. The target SN may determine that radio resource handling different from that for a UE should be applied to the IAB node based on the IAB node indication.

In step S1211, the MN may receive, from the target SN, an SN addition request ACK message.

In step S1213, the MN may transmit, to the IAB node, an SN change command message.

IN step S1215, the IAB node may perform SN change from the source SN to the target SN.

In step S1217, the IAB node may be served by the MN and the target SN in DC.

In step S1219, the UE may perform a communication via the IAB node which is served by the MN and the target SN in DC after the IAB node performed the SN change from the source SN to the target SN.

Figure 13:
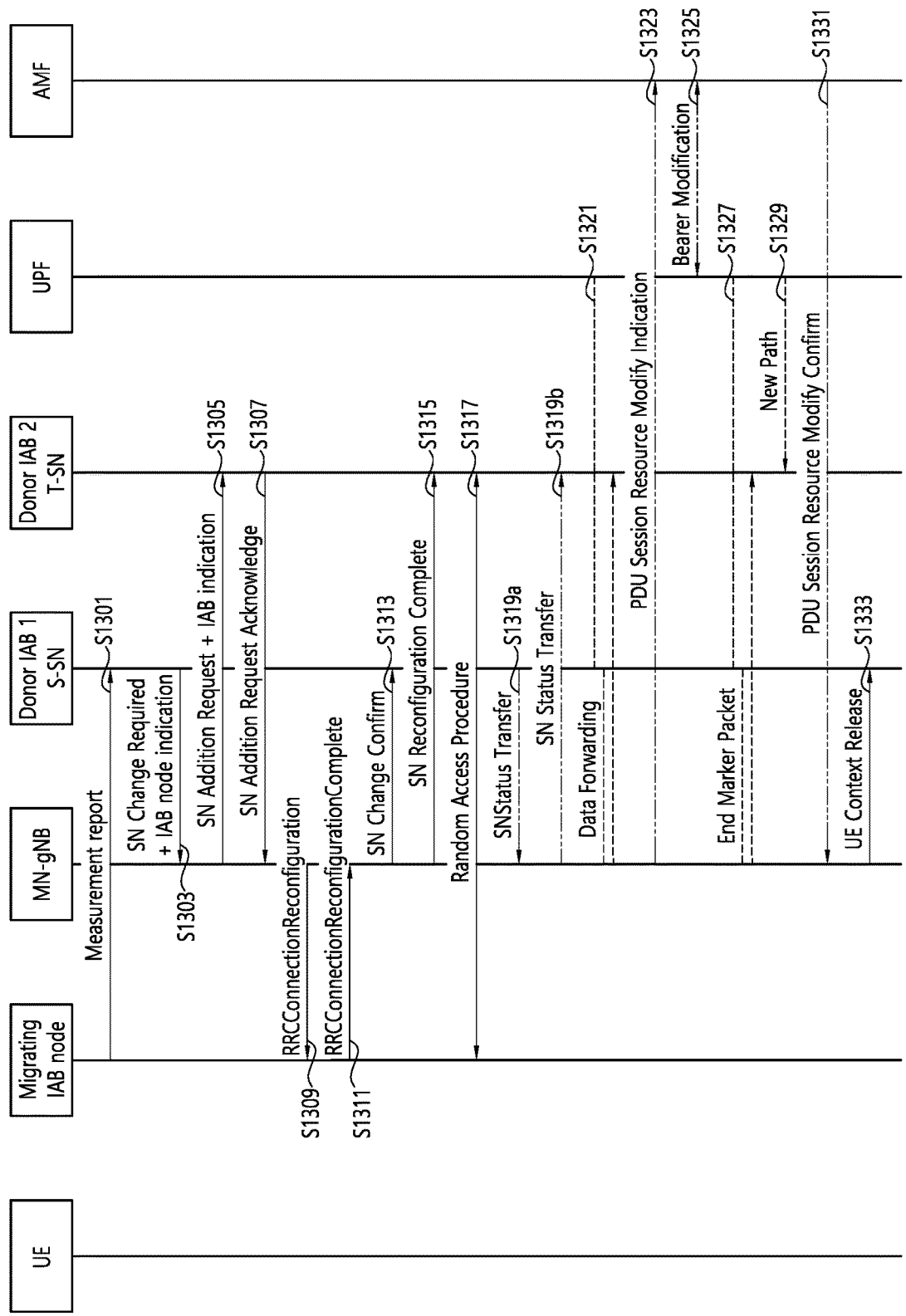
FIG. 13 shows an example signalling flow for an IAB node change according to an embodiment of the present disclosure.

FIG. 13 shows an example signalling flow for an IAB node change according to an embodiment of the present disclosure. The IAB node change may be initiated by a donor IAB node 1 (i.e., source SN).

Referring to FIG. 13, in step S1301, the migrating IAB node may transmit a measurement report to the donor IAB node 1 (i.e., source SN) if SRB3 is used. The donor IAB node 1 (i.e., source SN) may determine whether to perform SN change for the migrating IAB node based on the measurement report.

In step S1303, if the donor IAB node 1 (i.e., source SN) decides to perform a donor change for the migrating IAB node, the donor IAB node 1 (i.e., Source SN) may initiate the SN change procedure by sending the SN Change Required message, which contains at least one of candidate target node IDs, SCG configuration (to support delta configuration) related to the candidate target nodes, or measurement results related to the candidate target nodes including the target SN. The donor IAB node 1 (i.e., source SN) may also include an IAB node indication in the SN change required message. The IAB node indication may be used to tell the master gNB that the SN change is an IAB node's mobility and also used for the master gNB to select the proper target donor IAB node (target SN), which supports the IAB function, for the migrating IAB node.

In step S1305, if the IAB node indication is included in the SN change required message (i.e., SN change request is from an IAB node and/or the SN change is an IAB node's mobility), the master gNB may select the proper target donor IAB node, which supports IAB function, for the migrating IAB node. The master gNB may also include the IAB node indication in the SN addition request message sent to the selected target Donor IAB node. The target Donor IAB node shall, if supported, consider that the SN addition request is related to an IAB node, which means that the radio resource handing will be different from that for a normal UE since there may be a large number of UEs/wireless devices under being served by the migrating IAB node. Further, the measurement results related to the target node received from the source donor IAB node may also be included in the SN addition request message.

In step S1307, the target donor IAB node may transmit a SN addition request acknowledgement (ACK) message to the master gNB. If data forwarding is needed, the target donor IAB node may provide data forwarding addresses to the master gNB via the SN addition request ACK message. The target donor IAB node may generate an SN RRC reconfiguration message. The SN RRC reconfiguration message may include RRC reconfiguration parameters (i.e., target cell configuration). The target donor IAB node may include the SN RRC reconfiguration message in the SN addition request ACK message, and may further include an indication of whether the RRC reconfiguration parameters are full RRC configuration or delta RRC configuration in the SN addition request ACK message.

In step S1309, the master gNB may trigger the migrating IAB node to apply the new configuration (i.e., RRC reconfiguration parameters). The master gNB may indicate the new configuration to the migrating IAB node in an MN RRC reconfiguration message including the SN RRC reconfiguration message generated by the target donor IAB node.

In step S1311, the migrating IAB node may apply the new configuration and send an MN RRC reconfiguration complete message, including an SN RRC response message for the target donor IAB node, if needed. In case the migrating IAB node is unable to comply with (part of) the configuration included in the MN RRC reconfiguration message, the migrating IAB node may perform a reconfiguration failure procedure.

In step S1313, if the allocation of resources related to the target donor IAB node was successful, the master gNB may confirm the change of the source IAB node (i.e., may transmit SN change confirm message to the source donor IAB node). If data forwarding is needed, the master gNB may provide data forwarding addresses to the source IAB donor node. If direct data forwarding is used for SN terminated bearers, the master gNB may provide data forwarding addresses as received from the target donor IAB node to source donor IAB node. Reception of the SN Change Confirm message may trigger the source donor IAB node to stop providing user data to the migrating IAB node and, if applicable, to start data forwarding.

In step S1315, if the RRC connection reconfiguration procedure was successful, the master gNB may inform the target donor IAB node via SN Reconfiguration Complete message with the included SN RRC response message for the target donor IAB node, if received from the migrating IAB node.

In step S1317, the migrating IAB node may synchronize to the target donor IAB node.

In step S1319, if PDCP termination point is changed for bearers using RLC AM, the source donor IAB node may send an SN Status Transfer, which the master gNB send then to the target donor IAB node, if needed.

In step S1321, if applicable, data forwarding from the source donor IAB node may take place. The data forwarding may be initiated as early as the source donor IAB node receives the SN Change Confirm message from the master gNB.

In step S1323 to S1331, if applicable, a PDU session path update procedure may be triggered by the master gNB.

In step S1333, upon reception of the UE Context Release message, the source donor IAB node may release radio and C-plane related resources associated to the UE context. Any ongoing data forwarding may continue.

Hereinafter, an apparatus for a MN serving a wireless device with a source SN in DC in a wireless communication system, according to some embodiments of the present disclosure, will be described.

For example, the MN may include at least one processor, a transceiver, and a memory.

For example, the at least one processor may be configured to be coupled operably with the memory and the transceiver.

The at least one processor may be configured to control the transceiver to receive, from a source SN, a message for initiating a SN change procedure. The message may comprise an IAB node indication informing that the SN change procedure is related to a mobility of an IAB node. The message may be a SN change required message. The at least one processor may be configured to select a target SN supporting an IAB function based on the IAB node indication. The IAB function may be a function to communicate with an IAB node via a wireless backhaul channel. The at least one processor may be configured to control the transceiver to transmit, to the target SN, an SN addition request message comprising the IAB node indication. The at least one processor may be configured to control the transceiver to receive, from the target SN, an SN addition request acknowledge message.

The IAB node indication in the message may instruct the MN to select a target SN supporting the IAB function among candidate target SNs for SN change. The IAB node indication in the SN addition request message may inform that controlling of radio resources for an IAB node rather than that for a UE is to be performed.

The message and/or the SN change required message may comprise at least one of identities (IDs) of candidate target SNs for SN change, secondary cell group (SCG) configurations related to the candidate target SNs, or measurement results related to the candidate target SNs.

To select the target SN, the at least one processor may be configured to identify at least one candidate target SN of which ID informs that the IAB function is supported among the candidate target SNs based on the IAB node indication. The at least one processor may be configured to select the target SN among the at least one candidate target SN based on a measurement result related to the at least one candidate target SN. For example, the at least one processor may be configured to select the target SN whose cell quality indicated by the measurement result is the highest among the at least one candidate target SN.

The wireless device may comprise an IAB node performing an SN change from the source SN to the target SN.

Hereinafter, an apparatus for a wireless device in a wireless communication system, according to some embodiments of the present disclosure, will be described.

For example, the wireless device may include at least one processor, a transceiver, and a memory.

For example, the at least one processor may be configured to be coupled operably with the memory and the transceiver.

The at least one processor may be configured to perform a communication via an IAB node served by a MN and a source SN in DC. The at least one processor may be configured to perform a communication via the IAB node served by the MN and a target SN in DC after the IAB node performed a SN change from the source SN to the target SN. The target SN may be selected by the MN such that the target SN supports an IAB function based on an IAB node indication. The IAB node indication may inform that the SN change is related to a mobility of an IAB node. The IAB node indication may be received by the MN from the source SN via a message for initiating the SN change. The IAB node indication may be transmitted from the MN to the target SN via a SN addition request message for the SN change.

Hereinafter, a processor for a MN serving a wireless device with a source SN in DC in a wireless communication system, according to some embodiments of the present disclosure, will be described.

The processor may be configured to control the transceiver to receive, from a source SN, a message for initiating a SN change procedure. The message may comprise an IAB node indication informing that the SN change procedure is related to a mobility of an IAB node. The message may be a SN change required message. The processor may be configured to select a target SN supporting an IAB function based on the IAB node indication. The IAB function may be a function to communicate with an IAB node via a wireless backhaul channel. The processor may be configured to control the transceiver to transmit, to the target SN, an SN addition request message comprising the IAB node indication. The processor may be configured to control the transceiver to receive, from the target SN, an SN addition request acknowledge message.

Hereinafter, a non-transitory computer-readable medium has stored thereon a plurality of instructions for a MN serving a wireless device with a source SN in DC in a wireless communication system, according to some embodiments of the present disclosure, will be described.

According to some embodiment of the present disclosure, the technical features of the present disclosure could be embodied directly in hardware, in a software executed by a processor, or in a combination of the two. For example, a method performed by a wireless device in a wireless communication may be implemented in hardware, software, firmware, or any combination thereof. For example, a software may reside in RAM memory, flash memory, ROM memory, EPROM memory, EEPROM memory, registers, hard disk, a removable disk, a CD-ROM, or any other storage medium.

Some example of storage medium is coupled to the processor such that the processor can read information from the storage medium. In the alternative, the storage medium may be integral to the processor. The processor and the storage medium may reside in an ASIC. For other example, the processor and the storage medium may reside as discrete components.

The computer-readable medium may include a tangible and non-transitory computer-readable storage medium.

For example, non-transitory computer-readable media may include random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, or any other medium that can be used to store instructions or data structures. Non-transitory computer-readable media may also include combinations of the above.

In addition, the method described herein may be realized at least in part by a computer-readable communication medium that carries or communicates code in the form of instructions or data structures and that can be accessed, read, and/or executed by a computer.

According to some embodiment of the present disclosure, a non-transitory computer-readable medium has stored thereon a plurality of instructions. The stored a plurality of instructions may be executed by a processor of the MN.

The stored a plurality of instructions may cause the MN to: receive, from the source SN, a message for initiating a SN change procedure, wherein the message comprises an IAB node indication informing that the SN change procedure is related to a mobility of an IAB node; select a target SN supporting an IAB function based on the IAB node indication; transmit, to the target SN, an SN addition request message comprising the IAB node indication; and receive, from the target SN, an SN addition request acknowledge message.

The present disclosure may have various advantageous effects.

For example, by providing an IAB node indication, target SN supporting IAB function can be properly selected based on the IAB node indication in SN change procedure for an IAB node.

For example, the enhanced procedure can allow mobile IAB node to be supported in dual connectivity scenario. The handing of migrating/mobile IAB node can be prioritized compared a normal UE from the target donor IAB node point of view, that is, the radio resource handling will be different/prioritized for an IAB node compared with a normal UE.

Advantageous effects which can be obtained through specific embodiments of the present disclosure are not limited to the advantageous effects listed above. For example, there may be a variety of technical effects that a person having ordinary skill in the related art can understand and/or derive from the present disclosure. Accordingly, the specific effects of the present disclosure are not limited to those explicitly described herein, but may include various effects that may be understood or derived from the technical features of the present disclosure.

Claims in the present disclosure can be combined in a various way. For instance, technical features in method claims of the present disclosure can be combined to be implemented or performed in an apparatus, and technical features in apparatus claims can be combined to be implemented or performed in a method. Further, technical features in method claim(s) and apparatus claim(s) can be combined to be implemented or performed in an apparatus. Further, technical features in method claim(s) and apparatus claim(s) can be combined to be implemented or performed in a method. Other implementations are within the scope of the following claims.

What is claimed is:

1. A method performed by a master node serving a wireless device with a source secondary node in a dual connectivity in a wireless communication system, the method comprising:
   receiving, from the source secondary node supporting wireless backhauling, a message for initiating a secondary node change for the wireless device,
   wherein the message comprises wireless backhauling node information informing that the secondary node change is related to a mobility of the wireless device supporting wireless backhauling;
   selecting a target secondary node supporting wireless backhauling, based on the wireless backhauling node information;
   transmitting, to the target secondary node, the wireless backhauling node information;
   obtaining reconfiguration information for the secondary node change to the target secondary node; and
   transmitting, to the wireless device, the reconfiguration information.

2. The method of claim 1, wherein the message is a secondary node change required message.

3. The method of claim 1, wherein the wireless backhauling node information in the message instructs the master node to select the target secondary node supporting the wireless backhauling among candidate secondary nodes for the secondary node change.

4. The method of claim 1, wherein the message comprises at least one of identities of candidate secondary nodes, secondary cell group configurations related to the candidate secondary nodes, or measurement results related to the candidate secondary nodes.

5. The method of claim 4, wherein the selecting of the target secondary node comprises:
   identifying at least one candidate secondary node of which ID informs that the wireless backhauling is supported among the candidate secondary nodes based on the wireless backhauling node information; and
   selecting the target secondary node among the at least one candidate secondary node based on a measurement result related to the at least one candidate secondary node.

6. The method of claim 1, wherein the wireless backhauling is a function to communicate with an integrated access and backhaul (IAB) node via a wireless backhaul channel.

7. The method of claim 1, wherein the wireless device comprises an integrated access and backhaul (IAB) node performing the secondary node change from the source secondary node to the target secondary node.

8. The method of claim 1, wherein the wireless device is in communication with at least one of a user equipment, a network, or autonomous vehicles other than the wireless device.

9. A master node serving a wireless device with a source secondary node in a dual connectivity in a wireless communication system, the master node MN comprising:
   a transceiver;
   a memory; and
   at least one processor operatively coupled to the transceiver and the memory,
   wherein the memory stores instructions that, based on being executed by the at least one processor, perform operations comprising:
   receiving, from the source secondary node supporting wireless backhauling, a message for initiating a secondary node change for the wireless device,
   wherein the message comprises wireless backhauling node information informing that the secondary node change is related to a mobility of the wireless device supporting wireless backhauling;
   selecting a target secondary node supporting wireless backhauling, based on the wireless backhauling node information;
   transmitting, to the target secondary node, the wireless backhauling node information;
   obtaining reconfiguration information for the secondary node change to the target secondary node; and
   transmitting, to the wireless device, the reconfiguration information.

10. The master node of claim 9, wherein the wireless backhauling node information in the message instructs the master node to select the target secondary node supporting wireless backhauling among candidate secondary nodes for the secondary node change.

11. The master node of claim 9, wherein the message comprises at least one of identities of candidate secondary nodes, secondary cell group configurations related to the candidate secondary nodes, or measurement results related to the candidate secondary nodes.

12. The master node of claim 11, wherein the at least one processor is further configured to:
- identify at least one candidate secondary node of which ID informs that wireless backhauling is supported among the candidate secondary nodes based on the wireless backhauling node information; and
- select the target secondary node among the candidate secondary nodes based on a measurement result related to the candidate secondary nodes.

13. The master node of claim 9, wherein the wireless backhauling is a function to communication with an integrated access and backhaul (IAB) node via a wireless backhaul channel.

14. The master node of claim 9, wherein the wireless device comprises an integrated access and backhaul (IAB) node performing the secondary node change from the source secondary node to the target secondary node.

15. A method performed by a wireless device served by a master node and a source secondary node in a dual connectivity in a wireless communication system, the method comprising:
- receiving, from the master node, reconfiguration information for a secondary node change to a target secondary node; and
- applying the reconfiguration information,
- wherein a message for initiating the secondary node change for the wireless device is received by the master node from the source secondary node supporting wireless backhauling,
- wherein the message comprises wireless backhauling node information informing that the secondary node change is related to a mobility of the wireless device supporting wireless backhauling,
- wherein the target secondary node supporting wireless backhauling is selected based on the wireless backhauling node information, and
- wherein the wireless backhauling node information is transmitted by the master node to the target secondary node.

* * * * *